US007440584B2

(12) United States Patent
Yeung et al.

(10) Patent No.: US 7,440,584 B2
(45) Date of Patent: Oct. 21, 2008

(54) SYSTEM AND METHOD FOR MARKING DATA AND DOCUMENT DISTRIBUTION

(75) Inventors: Minerva Ming-Yee Yeung, Sunnyvale, CA (US); Mathew H. Taylor, San Jose, CA (US); Matthew J. Holliman, Libertyville, IL (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 11/333,598

(22) Filed: Jan. 17, 2006

(65) Prior Publication Data

US 2006/0115112 A1 Jun. 1, 2006

Related U.S. Application Data

(63) Continuation of application No. 09/540,704, filed on Mar. 31, 2000, now abandoned.

(51) Int. Cl.
*G06K 9/00* (2006.01)
(52) U.S. Cl. .......................... 382/100; 713/176; 380/54
(58) Field of Classification Search ................ 382/100, 382/232; 713/176; 380/210, 252, 287, 54; 704/200.1, 273; 381/73; 348/460, 463
See application file for complete search history.

(56) References Cited

U.S. PATENT DOCUMENTS

| 5,530,759 | A | | 6/1996 | Braudaway et al. |
| 5,960,081 | A | | 9/1999 | Vynne et al. |
| 5,995,625 | A | * | 11/1999 | Sudia et al. .................... 705/51 |
| 6,185,683 | B1 | | 2/2001 | Ginter et al. |
| 6,212,285 | B1 | | 4/2001 | Bender et al. |
| 6,215,421 | B1 | * | 4/2001 | Kondo et al. ................... 341/50 |
| 6,233,684 | B1 | | 5/2001 | Stefik et al. |
| 6,278,791 | B1 | | 8/2001 | Honsinger et al. |
| 6,301,369 | B2 | | 10/2001 | Powell et al. |
| 6,504,941 | B2 | | 1/2003 | Wong |
| 6,519,352 | B2 | * | 2/2003 | Rhoads ........................ 382/100 |
| 6,577,744 | B1 | | 6/2003 | Braudaway et al. |
| 6,750,985 | B2 | | 6/2004 | Rhoads |
| 6,879,701 | B1 | * | 4/2005 | Rhoads ........................ 382/100 |
| 7,194,635 | B1 | * | 3/2007 | Yoda ........................... 713/193 |

FOREIGN PATENT DOCUMENTS

WO    WO-99/45707    9/1999

OTHER PUBLICATIONS

Kankanhalli, M. S., et al., "Adaptive Visible Watermarking of Images", *Proceedings of the 1999 IEEE International Conference on Multimedia Computing and Systems*, vol. 1, (Jul. 1999),568-573.

* cited by examiner

*Primary Examiner*—Anand Bhatnagar
(74) *Attorney, Agent, or Firm*—Schwegman, Lundberg & Woessner, P.A.

(57) ABSTRACT

Systems and methods are provided through which marks are generated for combination with a host image, in which source or user information is encoded into the mark either as a visually perceptibly unobtrusive pattern, or encoded by an arrangement of visually perceptible marks. Systems and methods are also provided for decoding or estimating the user information from images that contain the marks and determining the user or source that the mark indicates within a measure of certainty.

17 Claims, 17 Drawing Sheets

SYSTEM AND METHOD FOR MARKING DATA AND DOCUMENT DISTRIBUTION

This application is a continuation of U.S. patent application Ser. No. 09/540,704, filed on Mar. 31, 2000, now abandoned which is incorporated herein by reference.

FIELD OF THE INVENTION

This invention relates generally to data source identification, and more particularly to watermarking electronic data in a manner that identifies a source.

BACKGROUND OF THE INVENTION

With the increasing popularity of computers, and with the advent of mass networks such as the Internet, electronic distribution of content, such as documents, images, and sound, has become much more common. However, electronic content distribution has raised concerns for the creators of such content. For example, content creators wish to ensure that copyright and other authorship and ownership and usage information is attached to their electronic content, such that subsequent attempts to determine the author, owner and user of the content are successful. Furthermore, the creators wish to determine that their content has not been altered since first being distributed electronically.

More specifically, determining the identity of a copyright infringer or the identity of a violator of confidence is also increasingly important to intellectual property. When the identity of such a perpetrator is made, further damage to an organization's intellectual property can be stopped and restitution obtained by the victim. After copyright of electronic on content, in conventional systems the identity of the perpetrators and conspirators have remained difficult, if not impossible to determine.

Watermarking allows questions of ownership and use of a given piece of content—which may be widely distributed by virtue of the Internet, for example—to be resolved, by attempting to decode an embedded secret from the content. That is, by watermarking content data, the data owner can determine whether a suspect piece of content is his or hers by determining whether the watermark is present in the suspect data. Watermarking is a technique used to label digital content by hiding copyright or other information into the underlying data. Unlike encryption used to restrict access to data, watermarking can be employed to provide solid evidence of authorship and usage. Like data hiding generally, the watermark remains with the media through typical content-preserving manipulations, e.g. cropping, compression, and so forth. However, unlike data hiding generally, with watermarking an unauthorized user cannot access the embedded information (i.e., the watermark). In addition, the power of an effective watermarking system lies in its degree of robustness. Robustness ensures that the embedded watermark can not be removed or tampered with without destroying or at least degrading the quality of the information.

Watermarks have conventionally been either visible, thereby potentially distracting from the content itself, or invisible, thereby being necessarily diminished in strength so as to avoid perceptible artifacts.

Visible watermarks in electronic documents have been employed as a means of preventing misuse of intellectual property by providing notice to all viewers that intellectual property rights are claimed in the document. In conventional systems, visible watermarks have been injected only at the original document creation to indicate ownership, and the perpetrators of later illicit use, such as authorized users who copy the document and/or distribute the document to unauthorized users, remain undetected. Conventional systems have therefore not been effective in identifying violations of copyright and trade secret after the misuse.

Existing invisible watermarking techniques can embed digital data bit strings indicating ownership identification. A bit string is an ordered sequence of bits. However, information embedded with watermarks is often lost or unretrievable following operations such as printing, scanning, photocopying, and other such signal conversions. More particularly, such techniques are intended only for bitmapped images such as natural scenes, and are not applicable to document images where the degradation of quality is often excessive.

Ownership identification information is any information that describes a user, such as ownership and usage information, identification information, a process identification number (PID), type of authorized use or the number of copies permitted. User identification information includes the phone number, the name or the computer system logon identification name, or the social security number of the user.

For the reasons stated above, and for other reasons stated below which will be appreciated by those skilled in the art upon reading and understanding the present specification, there is a need in the art for tracing the users of documents. There is also a need for improved marking and extraction of marks from documents.

DETAILED DESCRIPTION OF THE INVENTION

In the following detailed description of embodiments of the invention, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

Systems and methods are provided through which marks are generated for combination with a host image, in which source or user information is encoded into the mark either as a visually perceptibly unobtrusive pattern, or encoded by an arrangement of visually perceptible marks. Systems and methods are also provided for decoding or estimating the user information from images that contain the marks and determining the user or source that the mark indicates within a measure of certainty.

Hardware and Operating Environment

Figure 1:
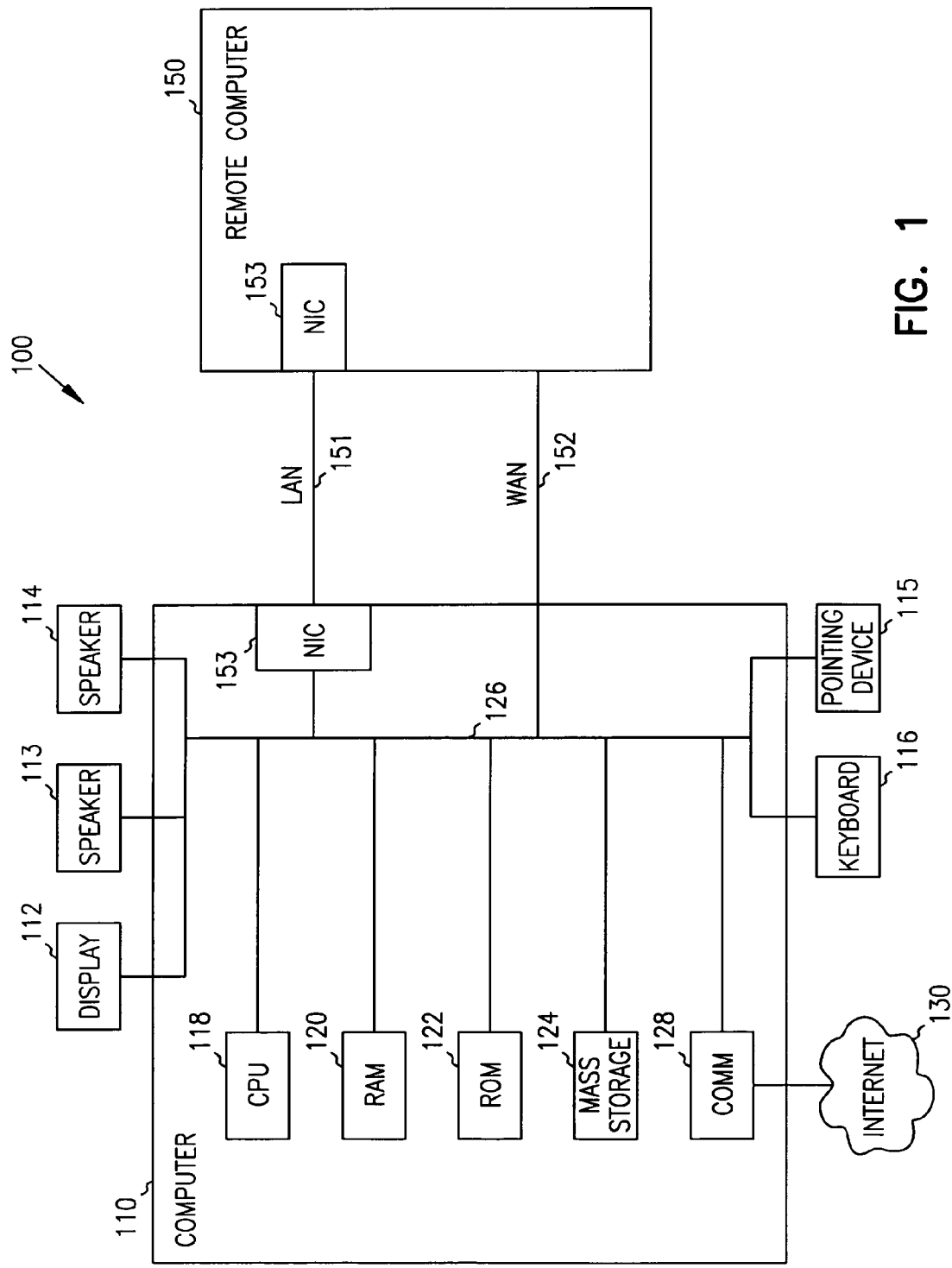
FIG. 1 is a block diagram of the hardware and operating environment in which different embodiments of the invention can be practiced.

FIG. 1 is a block diagram of the hardware and operating environment 100 in which different embodiments of the invention are practiced. The description of FIG. 1 provides an overview of a computer hardware and a suitable computing environment in conjunction with which some embodiments of the present invention are implemented. Embodiments of the present invention are described in terms of a computer executing computer-executable instructions. However, some embodiments of the present invention are implemented entirely in computer hardware in which the computer-executable instructions are implemented in read-only memory. One embodiment of the invention is implemented in client/server computing environments where remote devices that are linked through a communications network perform tasks. In one embodiment, program modules are located in both local and remote memory storage devices in a distributed computing environment.

Computer 110 is operatively coupled to display device 112, pointing device 115, and keyboard 116. Computer 110 includes a processor (CPU) 118, commercially available from, for example Intel, and others, random-access memory 120 (RAM), read-only memory 122 (ROM), and one or more mass storage devices 124, and a system bus 126, that operatively couples various system components including the system memory to the processing unit 118. Mass storage devices 124 are more specifically types of nonvolatile storage media and in varying embodiments include a hard disk drive, a floppy disk drive, an optical disk drive, and/or a tape cartridge drive, and corresponding storage media. A user enters commands and information into the computer 110 through input devices such as a pointing device 115 and a keyboard 116. Other input devices (not shown) may include a microphone, joystick, game pad, satellite dish, scanner, or the like. The processor 118 executes computer programs stored on the computer-readable media. Embodiments of the present invention are not limited to any type of computer 110. In varying embodiments, computer 110 comprises a PC-compatible computer, a MacOS-compatible computer or a UNIX-compatible computer. The construction and operation of such computers are well known within the art.

Furthermore, computer 110 can be communicatively connected to the Internet 130 via a communication device 128. The manner in which Internet 130 connectivity is well known within the art. In one embodiment, a communication device 128 is a modem that responds to communication drivers to connect to the Internet via what is known in the art as a "dial-up connection." In another embodiment, a communication device 128 is an Ethernet or similar hardware (network) card connected to a local-area network (LAN) that itself is connected to the Internet via what is known in the art as a "direct connection" (e.g., T1 line, etc.).

Computer 110 also has at least one operating environment running thereon, each providing a graphical user interface including a user-controllable pointer. Such operating environments include operating systems such as versions of the Microsoft Windows™ and Apple MacOS™ operating systems well-known in the art. Embodiments of the present invention are not limited to any particular operating environment, however, and the construction and use of such operating environments are well known within the art. Computer 110 also can have at least one web browser application program running within at least one operating environment, to permit users of computer 110 to access intranet or Internet world-wide-web pages as addressed by Uniform Resource Locator (URL) addresses. Such browser application programs include Netscape Navigator™ and Microsoft Internet Explorer™.

Display device 112 permits the display of information, including computer, video and other information, for viewing by a user of the computer. Embodiments of the present invention are not limited to any particular display device 112. Such display devices include cathode ray tube (CRT) displays (monitors), as well as flat panel displays such as liquid crystal displays (LCD's). Display device 112 is connected to the system bus 126. In addition to a monitor, a computer may include other peripheral input/output devices such as printers (not shown), speakers, pointing devices and/or a keyboard. Speakers 113 and 114 enable the audio output of signals. Speakers 113 and 114 are also connected to the system bus 126. Pointing device 115 permits the control of the screen pointer provided by the graphical user interface (GUI) of operating systems such as versions of Microsoft Windows™. Embodiments of the present invention are not limited to any particular pointing device 115. Such pointing devices include mouses, touch pads, trackballs, remote controls and point sticks. Finally, keyboard 116 permits entry of textual information into computer 110, as known within the art, and embodiments of the present invention are not limited to any particular type of keyboard.

The computer 110 can operate in a networked environment using logical connections to one or more remote computers, such as remote computer 150. These logical connections are achieved by a communication device coupled to, or a part of, the computer 110; embodiments of the present invention are not limited to a particular type of communications device. The remote computer 150 can be another computer, a server, a router, a network PC, a client, a peer device or other common network node. The logical connections depicted in FIG. 1 include a local-area network (LAN) 151 and a wide-area network (WAN) 152. Such networking environments are commonplace in offices, enterprise-wide computer networks, intranets and the Internet.

When used in a LAN-networking environment, the computer 110 and remote computer 150 are connected to the local network 151 through a network interface or adapter 153, which is one type of communications device. When used in a conventional WAN-networking environment, the computer 110 and remote computer 150 communicate with a WAN 152 through modems (not shown). The modem, which can be internal or external, is connected to the system bus 126. In a networked environment, program modules depicted relative to the computer 110, or portions thereof, can be stored in the remote memory storage device.

System Level Overview

Figure 2:
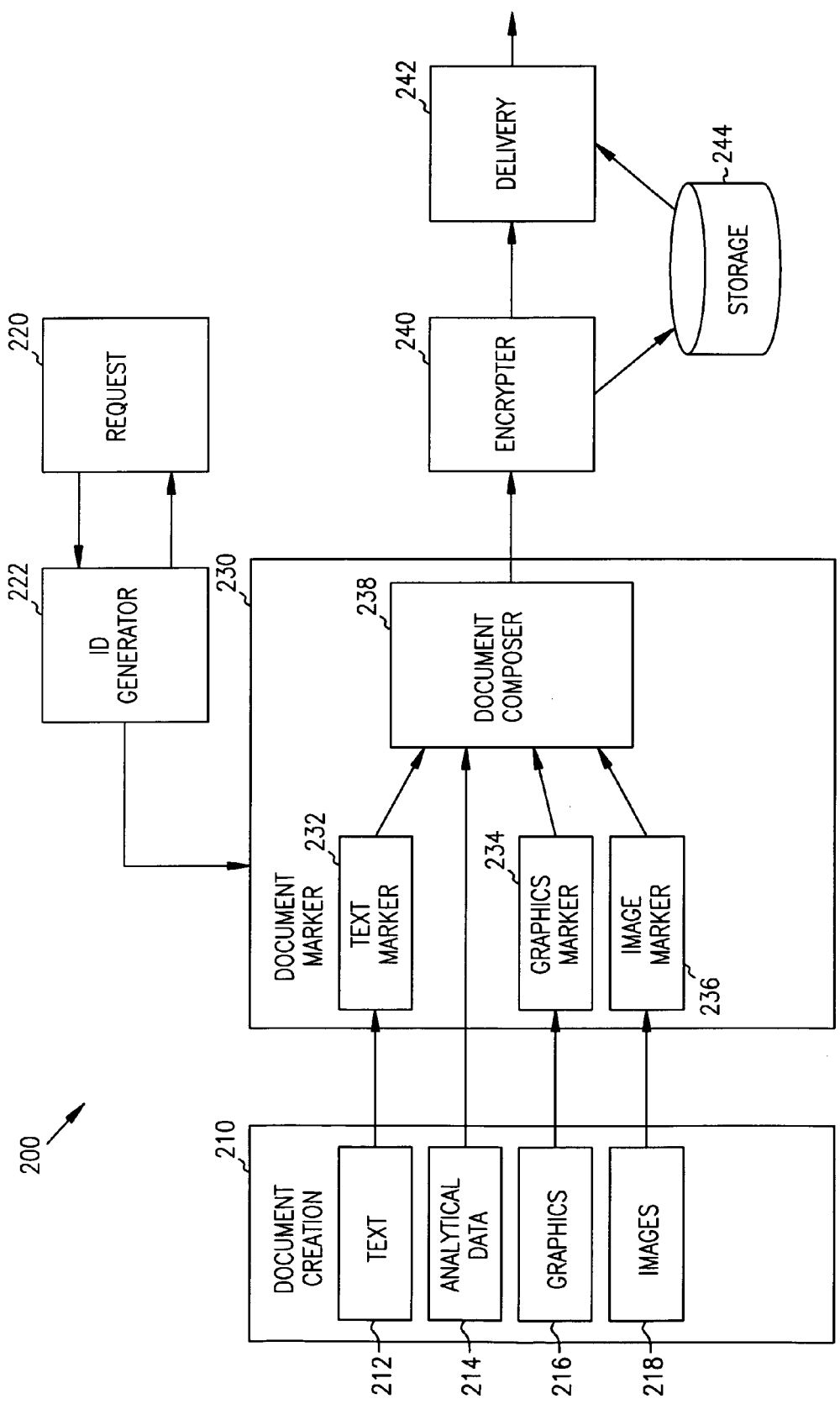
FIG. 2 is a block diagram illustrating a system-level overview of an embodiment of the invention.

FIG. 2 is a block diagram illustrating a system-level overview of a secure document delivery with marking capability embodiment of the invention. Embodiments of the invention are described as operating in a multi-processing, multi-threaded operating environment on a computer, such as computer 110 in FIG. 1.

System 200 illustrates a system to visually watermark electronic documents for document distribution that provides trace capability. The system allows for marking a document with some identification information as a visible mark, extracting the identification information and tracing the identification information to a particular user.

System 200 includes a document creation source 210 which originates text information 212, analytical data 214, such as spreadsheet data, database, and numerical data, graphics data 216, such as vector graphics data and chart and graph data, and bitmap image data 218. Graphics include charts, histograms, illustrations, etc. Images include natural photos and computer generated images. The document data 212, 214, 216, and/or 218 is transmitted to a document marker 230. In one embodiment, the document marker 230 is implemented in a document viewer, such as a browser (e.g. "NETSCAPE COMMUNICATOR"™), a general document processor (e.g. "MICROSOFT WORD"™) or a graphics document processor (e.g. "ADOBE ACROBAT" or "AUTOCAD"™).

System 200 also includes an ID generator 222 that generates an identification code (ID) based on request 220. The request 220 is a request to mark a document with the requester information. The requester information includes the requester identification information, the intended document control, or usage information. The supplied information will be mapped to an identification code in the ID generator which uses a predefined algorithm to take in the supplied information as input and output a binary representation (can be a reduced or compact form of the requester information, or encrypted or hashed version of such, or a part of the encryption or hashed version, etc.). The code is thus used to generate a mark (or equivalently, a watermark) to be inserted in the document marker 230. Generator 222 then transmits the ID to document marker 230.

Document marker 230 includes a text marker 232, a graphic marker 234 and a host image marker 236. The document marker receives an ID code and a document. More specifically, the text marker 232 receives text data 212, the graphic marker 234 receives graphics data 216 and the host image marker 236 receives image data 218. The text marker 232, the graphic marker 234 and the host image marker 236, 1) generate a mark using the ID and optionally, the data 212 216 and/or 218, respectively, then, 2) mark the data with the mark, and then 3) transmit the marked data to the document composer 238. The document composer 238 combines the marked data into a marked document and transmits the marked document to an optional encrypter 240. In an alternative embodiment, the document is combined with another mark before the mark is combined with the document by the document composer 238. In one embodiment, the document creation source 210 is implemented in the apparatus of an owner of the document data 212, 214, 216, and/or 218 and the document marker 230 is implemented in the apparatus of a user of the document data 212, 214, 216, and/or 218.

The encrypter 240 encrypts the combined data and thereafter, transmits the encrypted data to a delivery mechanism 242 and/or a storage device 244, which in turn, transmits the encrypted data to the delivery mechanism 242. Finally, the delivery mechanism 242 transmits the encrypted data to a destination (not shown).

Methods of an Embodiment of the Invention

The methods performed by the clients constitute computer programs, firmware, or hardware made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods performed by the server constitute computer programs, firmware, or hardware also made up of computer-executable instructions. Describing the methods by reference to flowcharts enables one skilled in the art to develop programs, firmware, or hardware, including instructions to carry out the methods on a suitable computerized server (the processor of the servers executing the instructions from computer-readable media).

Figure 3:
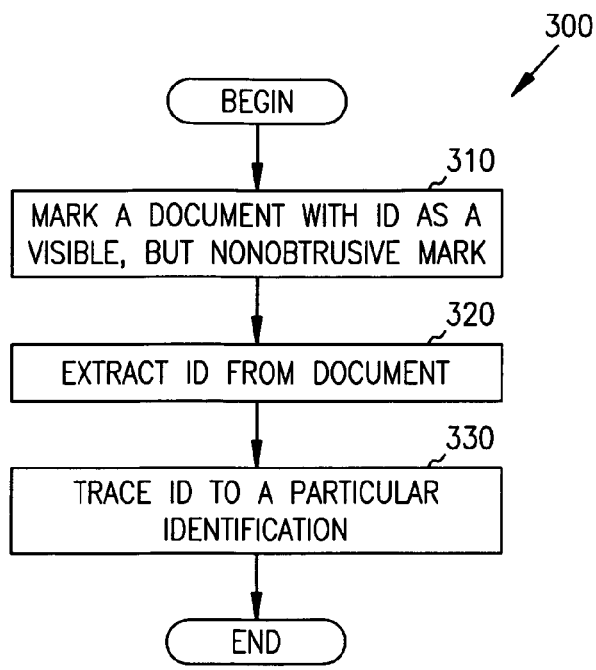
FIG. 3 is a flowchart of an embodiment of a method of visually marking documents and determining the mark that provides trace capability.

Referring first to FIG. 3, a flowchart of an embodiment of method 300 that provides trace capability by visually marking documents and determining or identifying the mark, is shown. Method 300 is performed by a program executing on, or performed by firmware or hardware that is a part of, a computer, such as computer 110 in FIG. 1.

Figure 5:
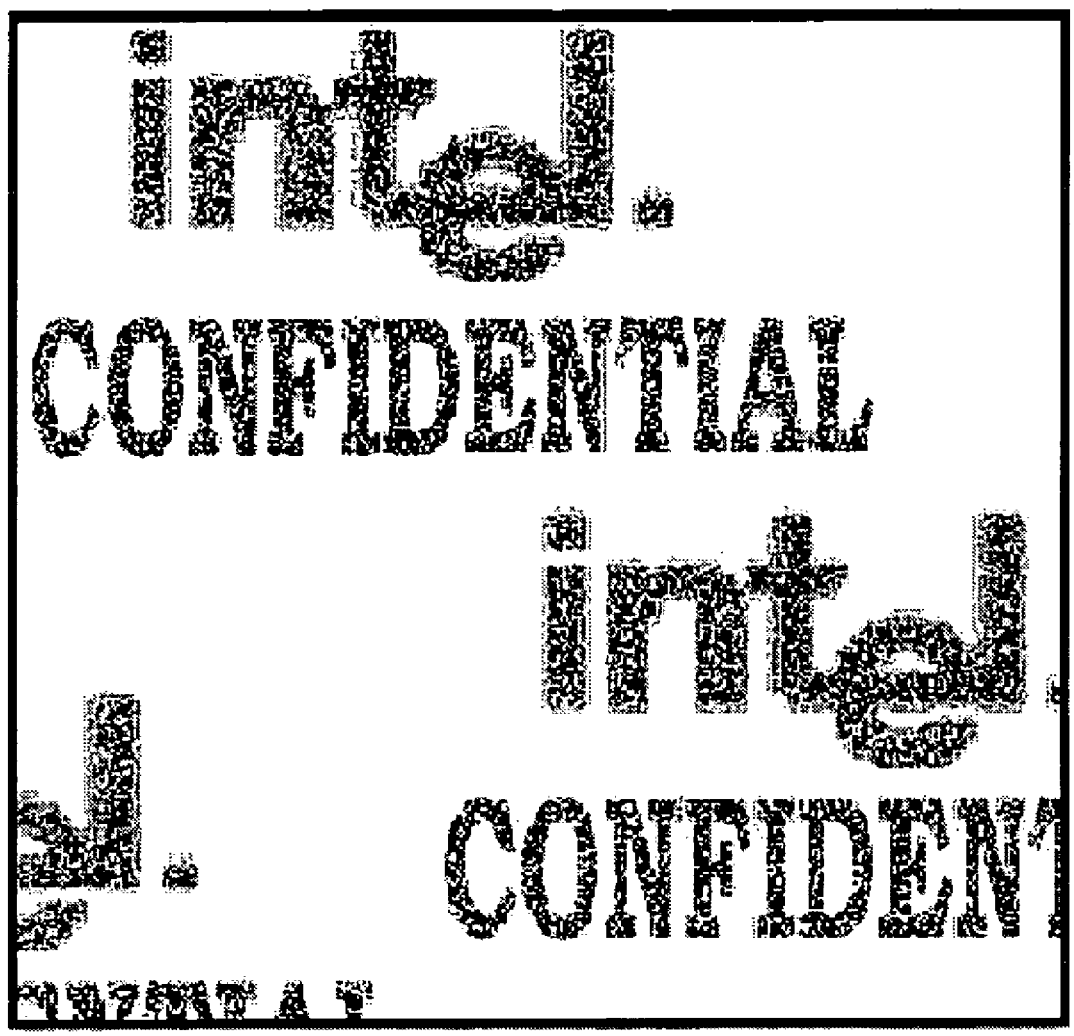
FIG. 5 is an example of a mark of identification information, such as ownership or usage information used in conjunction with the method disclosed in FIG. 4

Method 300 includes marking a document with some identification information as a visible and unobtrusive mark, such as 310 in FIG. 5, yielding a marked document. Thereafter the identification information is extracted from the marked document 320. Subsequently the identification information is traced to a particular identification, thereby enabling a determination of authorized or unauthorized use of the document to be made.

FIGS. 4, 5, 7, 8, and 9 and FIGS. 15-17 teach methods for creating a mark of user information suitable for combining with a host image.

Figure 4:
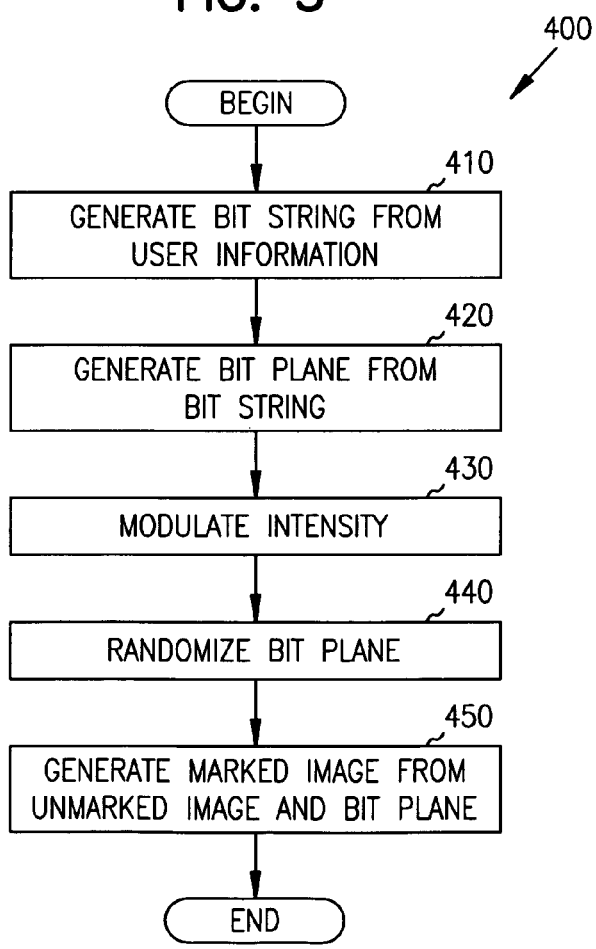
FIG. 4 is a flowchart of an embodiment of a method of generating a watermark from user information.

Referring next to FIG. 4, a flowchart of an embodiment of method 400 is illustrated that generates a perceptibly unobtrusive pattern watermark from user information.

Method 400 includes generating a bit string 410 from identification information or usage information such as a user ID, and one or more optional identification delimiters. Delimiters identify boundaries of a bit string, such as the beginning and/or the start of the bit string and are particularly useful in extraction of the bit string and the user information. A delimiter is a fixed string of known binary digits, such as "00000", "11111" or "10110". Distinct information produces distinct bit strings. In one embodiment, the bit string indicates a pattern of −1 and +1 values, where a binary '0' indicates a −1 and a binary '1' indicates +1. The +1 value is an indication that an intensity value in a target image is incremented, and a −1 value is an indication that an intensity value in a target image is decremented.

In one embodiment, delimiter(s) are concatenated onto the user information. In another embodiment, the bit string has a leading delimiter string and a trailing delimiter string, and the generation of the bit string 410 includes prepending the leading delimiter string to the user information and appending the trailing delimiter string to the user information. In yet another embodiment, an empty string such as "" is a valid delimiter string.

Thereafter, a bit plane or mark or watermark of repeated instances of the bit string is generated 420. The bit plane represents a graphical two-dimensional image with vertical and horizontal dimensions. The bit plane is a separate layer of image data and the bit plane is readily incorporated as a background texture in one or more target images. Generating a bit plane 420 further comprises tiling the bit string in which the bit string is wrapped around the boundaries of the bit plane.

In the embodiment where the bit string is generated 410 from user information or usage information, the bit plane that is generated from the bit string will be a faint but visible, perceptibly unobtrusive pattern, in which the user or usage information is not salient to the human eye, but is easily extracted by machine.

The bit plane is scaled to a target image according to a spreading factor. The spreading factor is a value indicating the extent to which the bit string is spread throughout the bit plane. The objective in spreading data is to decrease the frequency of the data, thereby improving the signal's robustness to filtering, lossy compression (e.g. JPEG), or small misalignments. In one embodiment, the spread bit plane is generated 420 according to the following formula in which a bit string d is tiled and the end of each row wraps around to the beginning of the next row:

$$b_{x,y} = d_i \qquad \text{Formula 1}$$

where $$i = \left(\text{floor}\left(\frac{Y}{S}\right)\text{floor}\left(\frac{N_x}{S}\right) + \text{floor}\left(\frac{x}{S}\right)\right) \bmod n$$

In Formula 1, $N_x$ is the number of horizontal pixels in the host image, S is the spreading factor, and n is the length of the bit string, all of which remain constant over the bit plane. y is the vertical position in the bit plane, and x is the horizontal position in the bit plane, both of which vary as the bit plane is populated with values from the bit string. $b_{x,y}$ is the bit to embed at position (x, y) and d is the data bit string to be embedded.

Figure 7:
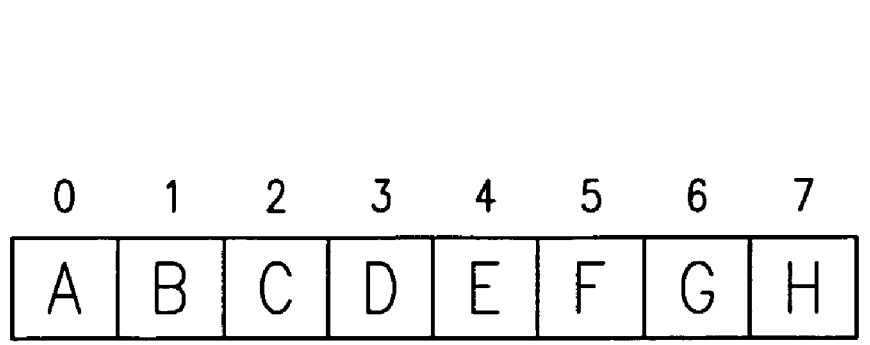
FIG. 7 is a diagram of a bit string used in conjunction with the method disclosed in FIG. 4.
Figure 8:
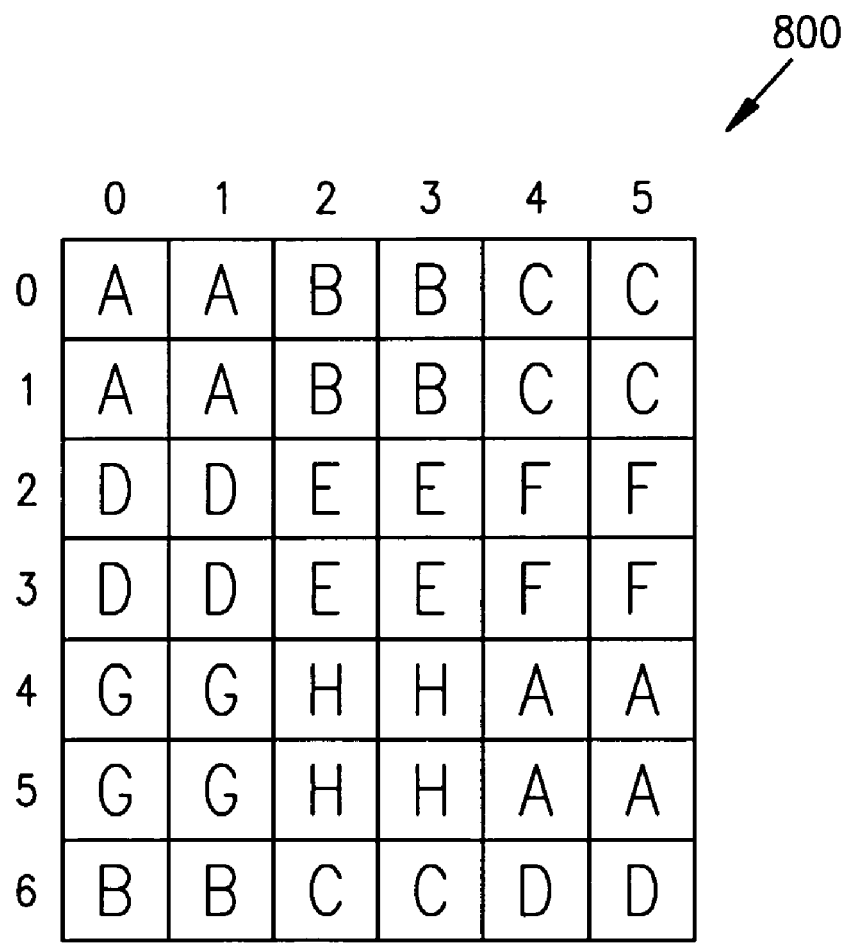
FIG. 8 is a diagram of a bit plane generated from the bit string in FIG. 7 and in conjunction with the method disclosed in FIG. 4.

For example, FIG. 7 illustrates a bit string that is eight bits in length, that is used to generate a bit plane 800 as in FIG. 8 according to Formula 1, where the bit plane 800 is six pixels wide and 7 pixels high. In FIG. 7 and FIG. 8, alphabetic letters are used to uniquely identify the contents of each of the positions in both figures so that the corresponding bit positions from FIG. 7 in FIG. 8 are clearly distinguished. Note that each of the values from the positions in the bit string 700 in FIG. 7 appear in blocks in the bit plane 800 in FIG. 8. More specifically, the value "A" from position (0) in bit string 700 in FIG. 7 appears in the block composed of positions (0, 0), (1, 0), (0, 1), and (1, 1) and in the block composed of positions (4, 4), (5, 4), (4, 5), and (5, 5), in the bit plane 800 in FIG. 8, using the notation (x, y) for the x and y position of each element. Note also that the sequence of values wraps around from one row to the next in bit plane 800 in FIG. 8, such as the value "C" in the block composed of positions (4, 0), (5, 0), (4, 1), and (5, 1) at the end of rows 0 and 1 wraps around to the value "D" in the block composed of positions (0, 2), (1, 2), (0, 3), and (1, 3) at the beginning of rows 2 and 3. The horizontal and vertical dimensions of each block in bit plane 800 in FIG. 8 are the spreading factor of the block. For example the horizontal and vertical dimensions of each block in bit plane 800 in FIG. 8 are two, which is the same size as the spreading factor of the block.

The following Table 1 illustrates the calculation for each position in bit block 800 in FIG. 1 using Formula 1:

TABLE 1

| Y Vert. Pos. | X Hor. Pos. | N No. of Hor. Pixels | S Spreading factor | N Length of bit string | \|(Y/S)\| | \|(n/S)\| | (Y/S)/(n/S) | \|(X/S)\| | (Y/S)/(n/S) + (X/S) | I Index |
|---|---|---|---|---|---|---|---|---|---|---|
| 0 | 0 | 6 | 2 | 8 | 0 | 3 | 0 | 0 | 0 | 0 |
| 0 | 1 | 6 | 2 | 8 | 0 | 3 | 0 | 0 | 0 | 0 |
| 0 | 2 | 6 | 2 | 8 | 0 | 3 | 0 | 1 | 1 | 1 |
| 0 | 3 | 6 | 2 | 8 | 0 | 3 | 0 | 1 | 1 | 1 |
| 0 | 4 | 6 | 2 | 8 | 0 | 3 | 0 | 2 | 2 | 2 |
| 0 | 5 | 6 | 2 | 8 | 0 | 3 | 0 | 2 | 2 | 2 |
| 1 | 0 | 6 | 2 | 8 | 0 | 3 | 0 | 0 | 0 | 0 |
| 1 | 1 | 6 | 2 | 8 | 0 | 3 | 0 | 0 | 0 | 0 |
| 1 | 2 | 6 | 2 | 8 | 0 | 3 | 0 | 1 | 1 | 1 |
| 1 | 3 | 6 | 2 | 8 | 0 | 3 | 0 | 1 | 1 | 1 |
| 1 | 4 | 6 | 2 | 8 | 0 | 3 | 0 | 2 | 2 | 2 |

TABLE 1-continued

| Y Vert. Pos. | X Hor. Pos. | N No. of Hor. Pixels | S Spreading factor | N Length of bit string | \|(Y/S)\| | \|(n/S)\| | (Y/S)/(n/S) | \|(X/S)\| | (Y/S)/(n/S) + (X/S) | I Index |
|---|---|---|---|---|---|---|---|---|---|---|
| 1 | 5 | 6 | 2 | 8 | 0 | 3 | 0 | 2 | 2 | 2 |
| 2 | 0 | 6 | 2 | 8 | 1 | 3 | 3 | 0 | 3 | 3 |
| 2 | 1 | 6 | 2 | 8 | 1 | 3 | 3 | 0 | 3 | 3 |
| 2 | 2 | 6 | 2 | 8 | 1 | 3 | 3 | 1 | 4 | 4 |
| 2 | 3 | 6 | 2 | 8 | 1 | 3 | 3 | 1 | 4 | 4 |
| 2 | 4 | 6 | 2 | 8 | 1 | 3 | 3 | 2 | 5 | 5 |
| 2 | 5 | 6 | 2 | 8 | 1 | 3 | 3 | 2 | 5 | 5 |
| 3 | 0 | 6 | 2 | 8 | 1 | 3 | 3 | 0 | 3 | 3 |
| 3 | 1 | 6 | 2 | 8 | 1 | 3 | 3 | 0 | 3 | 3 |
| 3 | 2 | 6 | 2 | 8 | 1 | 3 | 3 | 1 | 4 | 4 |
| 3 | 3 | 6 | 2 | 8 | 1 | 3 | 3 | 1 | 4 | 4 |
| 3 | 4 | 6 | 2 | 8 | 1 | 3 | 3 | 2 | 5 | 5 |
| 3 | 5 | 6 | 2 | 8 | 1 | 3 | 3 | 2 | 5 | 5 |
| 4 | 0 | 6 | 2 | 8 | 2 | 3 | 6 | 0 | 6 | 6 |
| 4 | 1 | 6 | 2 | 8 | 2 | 3 | 6 | 0 | 6 | 6 |
| 4 | 2 | 6 | 2 | 8 | 2 | 3 | 6 | 1 | 7 | 7 |
| 4 | 3 | 6 | 2 | 8 | 2 | 3 | 6 | 1 | 7 | 7 |
| 4 | 4 | 6 | 2 | 8 | 2 | 3 | 6 | 2 | 8 | 0 |
| 4 | 5 | 6 | 2 | 8 | 2 | 3 | 6 | 2 | 8 | 0 |
| 5 | 0 | 6 | 2 | 8 | 2 | 3 | 6 | 0 | 6 | 6 |
| 5 | 1 | 6 | 2 | 8 | 2 | 3 | 6 | 0 | 6 | 6 |
| 5 | 2 | 6 | 2 | 8 | 2 | 3 | 6 | 1 | 7 | 7 |
| 5 | 3 | 6 | 2 | 8 | 2 | 3 | 6 | 1 | 7 | 7 |
| 5 | 4 | 6 | 2 | 8 | 2 | 3 | 6 | 2 | 8 | 0 |
| 5 | 5 | 6 | 2 | 8 | 2 | 3 | 6 | 2 | 8 | 0 |
| 6 | 0 | 6 | 2 | 8 | 3 | 3 | 9 | 0 | 9 | 1 |
| 6 | 1 | 6 | 2 | 8 | 3 | 3 | 9 | 0 | 9 | 1 |
| 6 | 2 | 6 | 2 | 8 | 3 | 3 | 9 | 1 | 10 | 2 |
| 6 | 3 | 6 | 2 | 8 | 3 | 3 | 9 | 1 | 10 | 2 |
| 6 | 4 | 6 | 2 | 8 | 3 | 3 | 9 | 2 | 11 | 3 |
| 6 | 5 | 6 | 2 | 8 | 3 | 3 | 9 | 2 | 11 | 3 |

In one embodiment, after the bit plane is generated 420, the method includes generating a marked image 450 from the bit plane and the host image. The host image is formatted, for example, in one of the formats well-known to those skilled in the art, such as "MICROSOFT WORD"™, Portable Document Format (PDF) created by "ADOBE SYSTEMS"™, BMP, graphics interchange format (GIF), Joint Photographic Experts Group (JPEG), PCX originally developed by "ZSOFT"™ or Moving Picture Experts Group (MPEG). The bit plane and the host image are combined by performing an addition on each of the corresponding data points in the bit plane and the host image. In other words, the bit plane and the host image are added together to yield the marked image. In one embodiment, the entire bit plane is combined with the host image. In another embodiment, a portion, such as a region, of the bit plane is combined with the host image, as described in conjunction with FIG. 23. In yet another embodiment, the host image is combined with another bit plane before action 450; in other words, multiple bit planes are combined with a host image.

The marked image is generated 450 at a point in the use of the host image where it is desired that use of the host image be identified. For example, in one embodiment, the marked image is generated 450 before delivery to a user from an owner or authorized user of the host image; thereby the original source of the document is later identified. In another embodiment, the marked image is generated after delivery of the host image to a user, but before the host image is stored, viewed, or printed, or otherwise transmitted to a destination that is not authorized by the owner; thereby the user of the host image is identified after unauthorized use of the host image has been detected. The later embodiment is particularly useful when illicit use of the host image is discovered, such as copying the host image and delivering to an unauthorized user, in which the identification of the user is extracted as described below in conjunction with FIG. 9.

In one embodiment, the host image is a series of 24-bit words, each representing a pixel consisting of three 8-bit bytes, in which each byte indicates the intensity of one of the three represented colors, red, green and blue. In one embodiment, the host image may be represented in a colour space such as YUV, i.e. intensity or gamma-corrected luma and two chrominance components. In another embodiment, the host image is represented in a colour space such as RGB. The lowest intensity is typically represented by a "0" value and the highest intensity is represented by the greatest value that is typically represented in the byte, such as 255 in an eight-bit byte. When the bit plane is combined with the host image, each intensity value of each pixel in the host image is incremented or decremented according to the value indicated by the corresponding point in the bit plane. For example, where an intensity value in a pixel of a host image is 138, and value indicated by the corresponding point in the bit plane is −1, the combined value is generated by adding the values together, resulting in 137.

In one embodiment, the method also includes adapting the watermark strength, intensity or bit plane amplitude, 430. Adapting is also known as shaping the signal. Adapting 430 is performed by increasing or decreasing the bit plane amplitude values. In varying embodiments, adapting the watermark signal strength 430 is performed during the generation of the bit plane 420, after the generation of the bit plane 420 and before generating a marked image 450, and during the generation of a marked image 450.

In the embodiment where modulating the strength 430 is performed during the generation of the marked image 450, the action is performed according to the following formula:

$$Y'_{x,y} = Y_{x,y} + \text{sign}(b_i) \cdot W_{x,y} \quad \text{Formula 2}$$

In formula 2, $W_{X,Y}$ is the watermark modulation strength at the $(x, y)^{th}$ pixel, $Y_{x,y}$ and $Y'_{x,y}$ are the unwatermarked and watermarked image intensity at the at the $(x, y)^{th}$ pixel, respectively, and $b_{x,y}$ is the data bit ($b_{x,y}$, 0 {−1, 1} to be embedded at (x, y) as determined by Formula 1.

The modulation strength bit plane is used to identify the intensity modulation for each pixel or position in the bit plane 800 in FIG. 8, wherein each intensity modulation value in the modulation strength bit plane indicates the extent, degree or amount of modulation. For example, where the intensity value ranges from 0 to 255, an intensity modulation value might range from −15 to +15. More specifically, an intensity modulation value of −15 indicates that a corresponding intensity value is reduced by 15.

In one embodiment modulating the intensity of the bit plane 430 includes modulating the intensity of the bit plane randomly in order to increase the textured appearance of the watermark. The intensity of the bit plane is modulated randomly or pseudo-randomly. Pseudo-random actions are actions that are apparently random, but in fact are pre-determined or deterministic, such as the generation of random numbers on conventional computer systems in which the same sequence of random numbers are generated each time a random-number generator is initialized and used. Conventionally, the random-number generator is initialized with a "key" number, with which the random-number generator will thereafter generate the same sequence of numbers every time a particular key is used. In another embodiment modulating the intensity of the bit plane 430 is performed according to local characteristics of the host image that the bit plane is later combined with, in which the modulation occurs either before the combining 450 or during the combining 450 identification. In one embodiment of modulating the intensity of the bit plane 430 according to local characteristics of the host image, in which the host image includes text and graphics, the amplitude of the bit plane is increased in portions that correspond to portions of the host image that represent text, and the amplitude of the bit plane is decreased in portions that correspond to portions of the host image that represent graphics.

In an additional embodiment the method includes randomizing the bit plane 440 in which randomization bits are inserted into the bit plane. Randomizing the bit plane is performed to make the texture of the watermark less regular and therefore less obtrusive to the human eye. Inserting randomization bits into the bit plane includes generating a pseudo-random bit plane and combining the pseudo-random bit plane with the bit plane. In one embodiment of generating the pseudo-random bit plane, the pseudo-random bit plane is formed by tiling a repeated pseudo-noise pattern, using dimensions that are relatively prime to the embedded bit string length. In one embodiment of combining the pseudo-random bit plane with the bit plane, the pseudo-random bit plane and the bit plane are combined by performing an exclusive-OR (XOR) between the corresponding pixels in each plane. The pseudo-random bit plane comprises a pre-determined or deterministic pattern.

Figure 9:
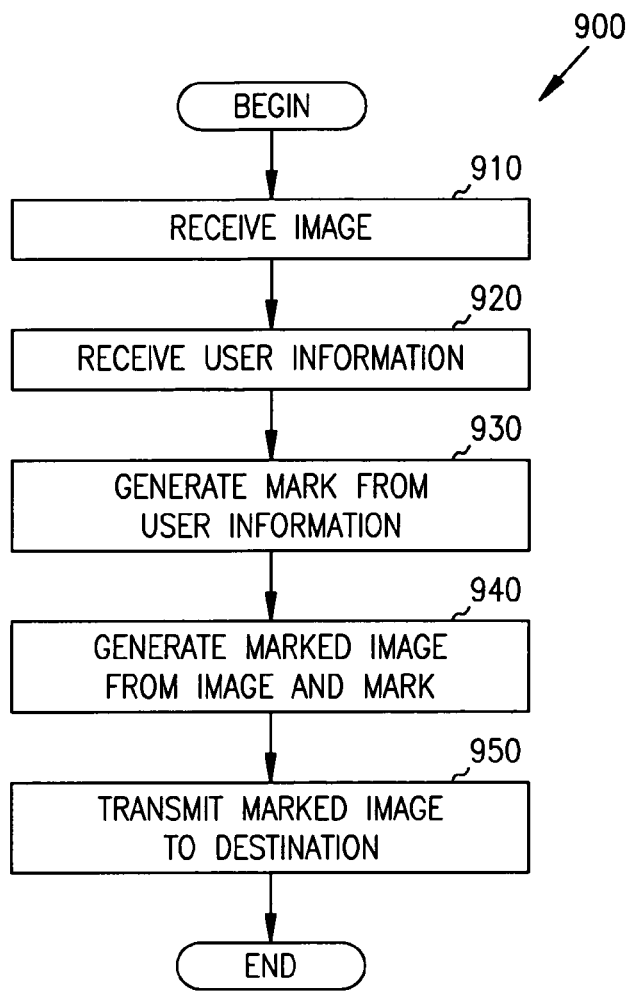
FIG. 9 is a flowchart of an embodiment of a method for marking and delivering a marked image with user information.

Referring next to FIG. 9, a flowchart of an embodiment of a method 900 of marking and delivering a host image with user information is shown.

The method 900 includes receiving an image 910 from a source 910, such as an owner of the host image. User information or data is received from a user 920. Thereafter, a mark is generated from the user information, the mark including a bit string indicating user information 930. Subsequently, the method includes generating a marked image from the mark and the host image 940.

Figure 10:
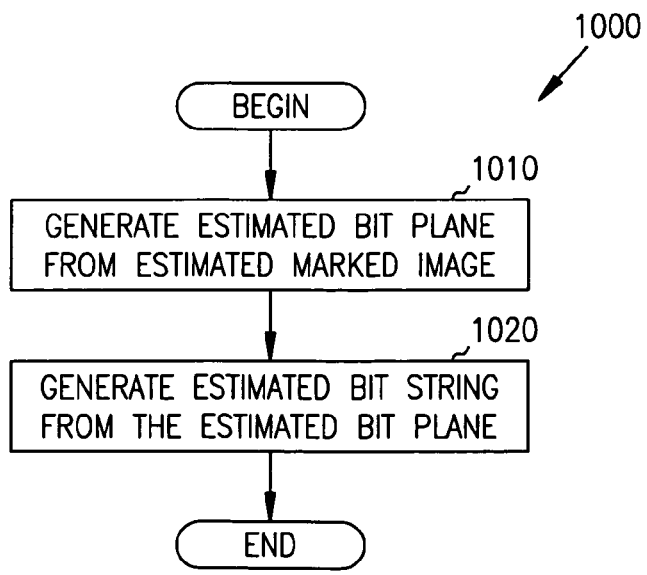
FIG. 10 is a flowchart of an embodiment of a method of extracting non-randomized user information from a marked image created by the methods disclosed in conjunction with FIG. 4 and FIG. 9.

Referring next to FIG. 10, a flowchart of an embodiment of a method 1000 of extracting user information from a non-randomized marked image created by the methods disclosed in conjunction with FIG. 3 and FIG. 9.

The method 1000 includes generating an estimated bit plane from the marked image 1010. Each marked image comprises a number of pixels as described above in conjunction with FIG. 4. Each marked image pixel has an intensity and a position in the image. The estimated bit plane is a number of estimated bits, each estimated bit corresponding to a block of pixels in the image. Lastly, the method comprises generating an estimated bit string from the estimated bit plane 1020.

Figure 11:
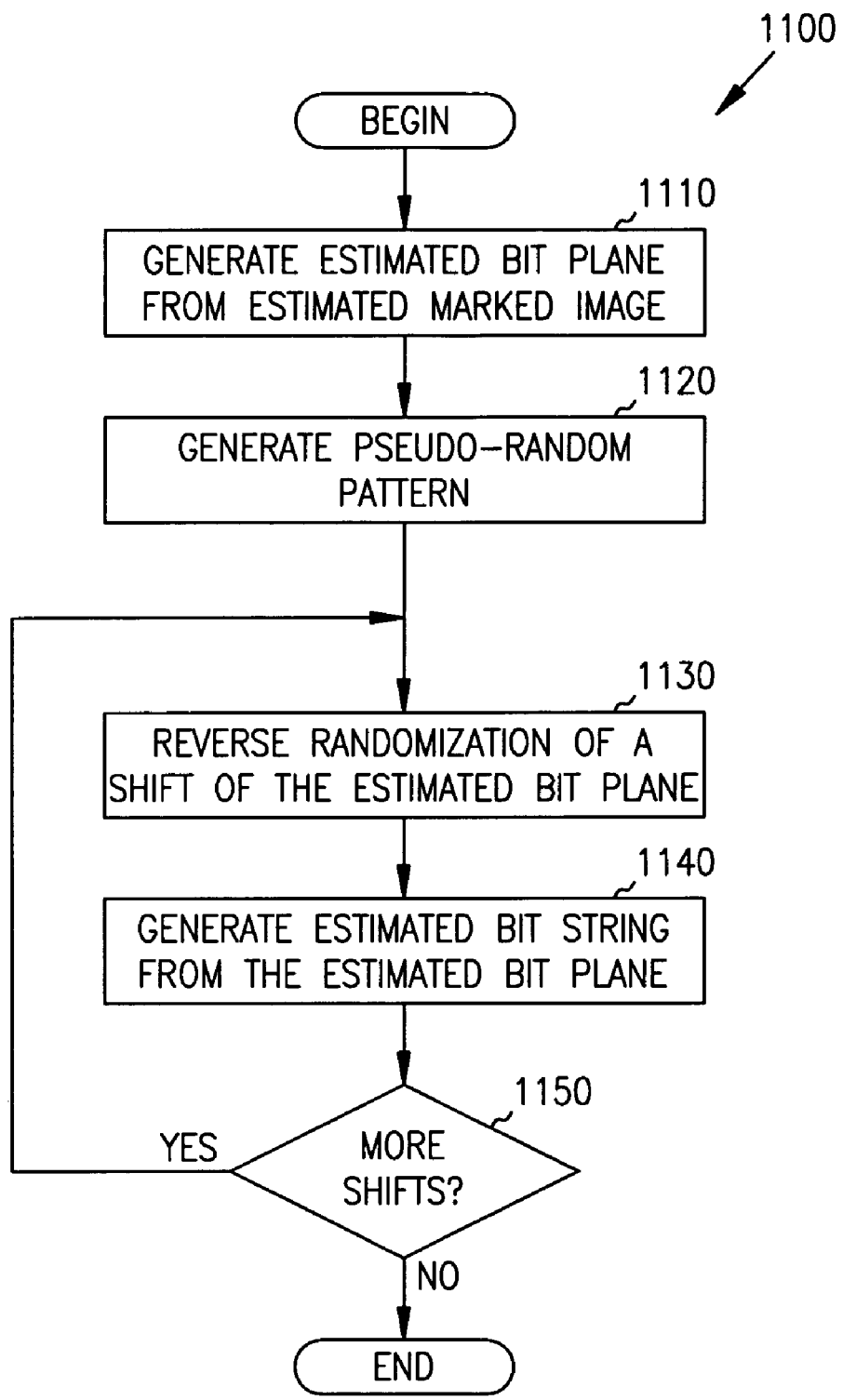
FIG. 11 is a flowchart of an embodiment of a method of extracting randomized user information from a marked image created by the methods disclosed in conjunction with FIG. 4 and FIG. 9.

Referring next to FIG. 11, a flowchart of an embodiment of a method 1100 of extracting user information from a randomized marked image created by the methods disclosed in conjunction with FIG. 3 and FIG. 9 is shown.

The method 1100 includes generating an estimated bit plane from the marked image 1110. As in method 1000, each marked image comprises a number of pixels as described above in conjunction with FIG. 4 and each marked image pixel has an intensity and a position in the image. The estimated bit plane is a number of estimated bits, each estimated bit corresponding to a block of pixels in the image.

Method 1100 also includes reestablishing detector synchronization with the estimated bit plane. Synchronization is reestablished by determining the maximal autocorrelation for the estimated bit plane following the undoing of each possible random shift, or by identifying the random shift that results in the most delimiter matches. To accomplish the resynchronization of the estimated bit plane, first, the pseudo-random plane is generated 1120 using the same key that was used in the randomizing, as in 440 in FIG. 4, or the pseudo-random plane is received. The pseudo-random plane can be accurately regenerated by invoking the pseudo-random number-generator using the same key that was used in randomizing the bit plane 440 in FIG. 4 in the generation of the watermark. Thereafter, for every possible shift of the pseudo-random plane the bit plane is un-randomized 1130 and the watermark is extracted using a maximum likelihood decoding computation in estimation of the bit string 1140. More specifically, to reverse randomization 1130, an exclusive-OR (XOR) is performed between the corresponding elements in the estimated bit plane and the pseudo-random plane that was used in the randomizing 440 in FIG. 4. The plane is XOR'ed with the estimated bit plane because only the correct shift of the pseudo-random plane will result in a periodic XOR'ed bit plane and all of the other shifts will still result in a random-looking bit plane. The correct shift of the pseudo-random plane is indicated either by maximizing the autocorrelation that is detected in estimation of the bit string 1140, or by maximizing the number of delimiter pattern matches. Action 1140 is described in detail in conjunction with FIG. 13.

Every shift of the pseudo-random bit plane is tested 1150, and after every shift is tested, the shift having the highest correlation identifies the ID information in the watermark.

The method 1100 estimates the bit plane and the bit string because it is not known with complete certainty to what extent a watermark modified the host image from its original state, and therefore it is not known with complete certainty of what values the bit plane and the estimated bit string are comprised.

Figure 12:
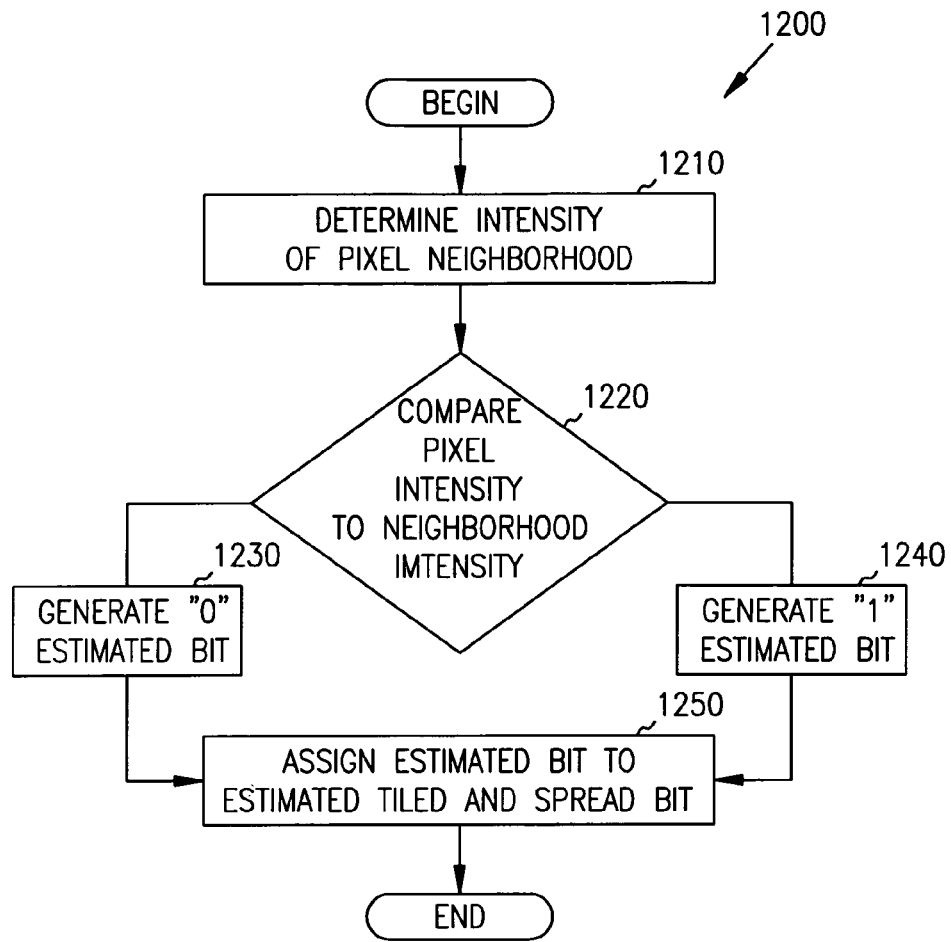
FIG. 12 is a flowchart of an embodiment of a method of generating an estimated bit plane from the marked image disclosed in conjunction with FIG. 10 and FIG. 11.

Referring next to FIG. 12, a flowchart of an embodiment of a method 1200 of generating an estimated bit plane from the marked image disclosed in action 1010 of FIG. 10.

The method of generating an estimated bit plane 1200 includes determining the average intensity of the "neighborhood" of the pixels 1210 surrounding each pixel in the marked image. A neighborhood is defined as a group of pixels surrounding the image pixel. In one example, the neighborhood is a subset of the group of pixels that are within proximity of the pixel. The proximity, or bounds, of the neighborhood is defined at least in part by the spreading factor of the marked image. For example, where the spreading factor is four, the neighborhood is a block of pixels that is four pixels wide and four pixels high. In one embodiment of large spreading factors, the neighborhood proximity is defined by the spreading factor, because a large number of nearby pixels contain the same sign watermark, and the degree of correlation between adjacent pixels in the original host image. The manner in which the degree of correlation calculated is well-known to those skilled in the art. The spreading factor is an input parameter to the method, in which the method includes receiving an indication of a spreading factor of the marked image. After the average intensity of the "neighborhood" is calculated, the average intensity is compared to the intensity of the pixel 1220 and thereafter, an estimated bit is generated in accordance with the comparison. In one embodiment, bit estimation generates a "1" binary value for the estimated bit if the pixel has intensity greater than the average neighborhood intensity 1230, or else a "0" binary value is generated for the estimated bit 1240. In other words, an intensity greater than the neighborhood average is estimated to be due to the embedding of a "1" bit at the location, whereas an intensity less than or equal to the neighborhood average is estimated to be due to a "0" representing a −1 value, in that location. In one embodiment of calculating the average intensity of the "neighborhood" 1210, comparing the intensity of the pixel to the average intensity of the neighborhood of the pixel 1220 generating an estimated bit 1230 1240, the following formula is used:

$$\hat{b}_{x,y} = \text{sign}\left(\hat{Y}'_{x,y} - \frac{1}{(2N+1)^2}\sum_{m=-N}^{N}\sum_{n=-N}^{N}\hat{Y}'_{x+m,y+n}\right) \quad \text{Formula 3}$$

In Formula 3, $\hat{b}_{x,y}$ is the estimated bit for position x and y, $\hat{Y}'_{x,y}$ is the intensity value in the image, N is the size in pixels of the neighborhood region, $\hat{Y}'_{x+m,y+n}$ is the intensity value of intensity (intensity) value of the pixel at location (x+m,y+n) in the (possibly corrupted) watermarked image, i.e. location (m,n) in the neighbourhood relative to the current neighbourhood centre (x,y), and m and n are loop indices indicating the relative location from the current pixel location represented by x and y.

Lastly, the method 1200 includes assigning the generated estimated bit to an estimated tiled and spread bit string 1250 in the position corresponding to the pixel in the marked image.

To compensate for possible shifting of the image due to manipulations such as printing, cropping and rescanning, which can cause watermark block boundaries to no longer correspond to those of the original embedder when method 1000 and method 1200 begin, a thresholding procedure is optionally performed. The thresholding procedure assumes a translation of block boundaries of (j, k) so that the (w, h)$^{th}$ element of bit plane P is calculated according to the following formula:

$$\hat{P}_{w,h} = \text{sign}\left(\sum_{m=0}^{S-1}\sum_{n=0}^{S-1}\hat{b}_{S\cdot w+m+j,S\cdot h+n+k}\right) \quad \text{Formula 4}$$

In Formula 4, S is the spreading factor, $0<=w<=[N_X/S]$, $0<=h<=[N_y/S]$, $0<=j<S$, and $0<=k<S$, where $N_X$ and $N_y$ are the dimensions of the suspected marked image.

The suspected translation (j, k) is determined by using the following formula:

$$\arg\max_{j,k} \sum_{w,k} \text{abs}\left(\sum_{m=0}^{S-1}\sum_{n=0}^{S-1}\hat{b}_{S\cdot w+m+j,S\cdot h+n+k}\right) \quad \text{Formula 5}$$

In Formula 5, (w, h), indicates an index into the bit plane P. The suspected translation is used for more robust detection, in which the correlation values is higher provided correct alignment. Nonetheless, even if the image is shifted slightly with respect to block boundaries, the watermark may still be detected.

Figure 13:
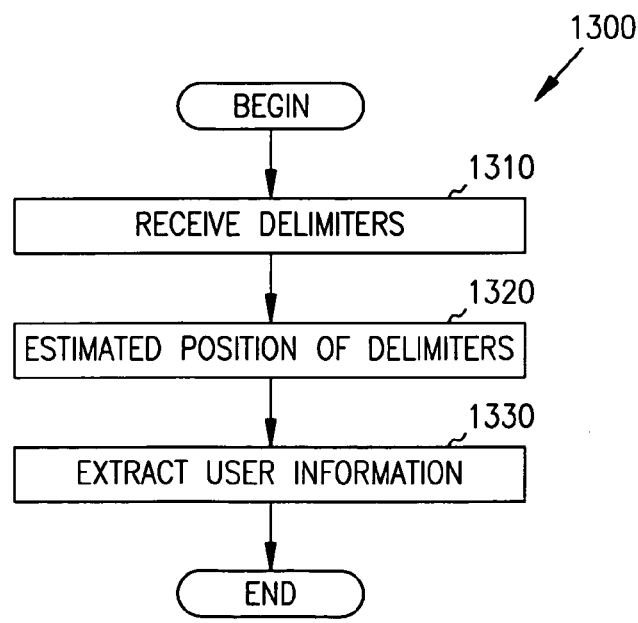
FIG. 13 is a flowchart of an embodiment of a method of generating an estimated bit string of identification information from the estimated bit plane disclosed in conjunction with FIG. 10 and FIG. 11.

Referring next to FIG. 13, a flowchart of an embodiment of a method 1300 of generating an estimated bit string of identification information from the estimated bit plane disclosed in action 1020 of FIG. 10 and action 1140 in FIG. 11 is shown.

The method of estimating the bit string 1300 includes receiving the delimiters 1310. The delimiters are included as part of the mark in the methods disclosed in conjunction with FIGS. 4-9 and apparatus disclosed in conjunction with FIGS. 22-23, in order to provide a flag or indicator for the beginning and the end of the user information; therefore, the method of extracting the user information requires definition of the delimiters. Thereafter, an estimation of the position of the delimiters 1320 in the estimated bit plane is determined based on a correlation between the delimiters and the estimated bit plane. In one embodiment, the shift k for a given row is estimated according to the following formula:

$$\arg\max_{k}(k)^{P_i \cdot d_i} \quad \text{Formula 6}$$

In Formula 6, $P_i$ is the $i^{th}$ row of the estimated bit plane, $d^k_j$ is the bit string that corresponds to the delimited bits in the $i^{th}$ row of the marked image, shifted by k positions, and where bit positions in d corresponding to non-delimiter (i.e. user information) bit are assigned the value of "0" so that they do not contribute to the correlation computation. Delimiter bits in d take on the value of −1 and 1. Determination of the final extracted string $b_i$ is performed in a number of methods well-known to those skilled in the art, such as a thresholding method. If the calculated correlation for the 'best shift' k exceeds an image-dependent threshold T, the delimiters are deemed to have been located, and the corresponding user information, positioned between the delimiters is extracted 1330. Optimal values for the image-dependent threshold T depend on the degree of degradation of the marked image. In one embodiment, T is estimated as a function of the bit plane. More specifically, a fixed fraction of rows in the bit plane are used in bit string estimation, in which the rows selected correspond to the rows exhibiting the maximal correlations in comparison to other rows in the marked image, as determined in Formula 6. The correct shift of the pseudo-random plane is indicated by maximizing the autocorrelation or by increasing the number of delimiter pattern matches.

Figure 14:
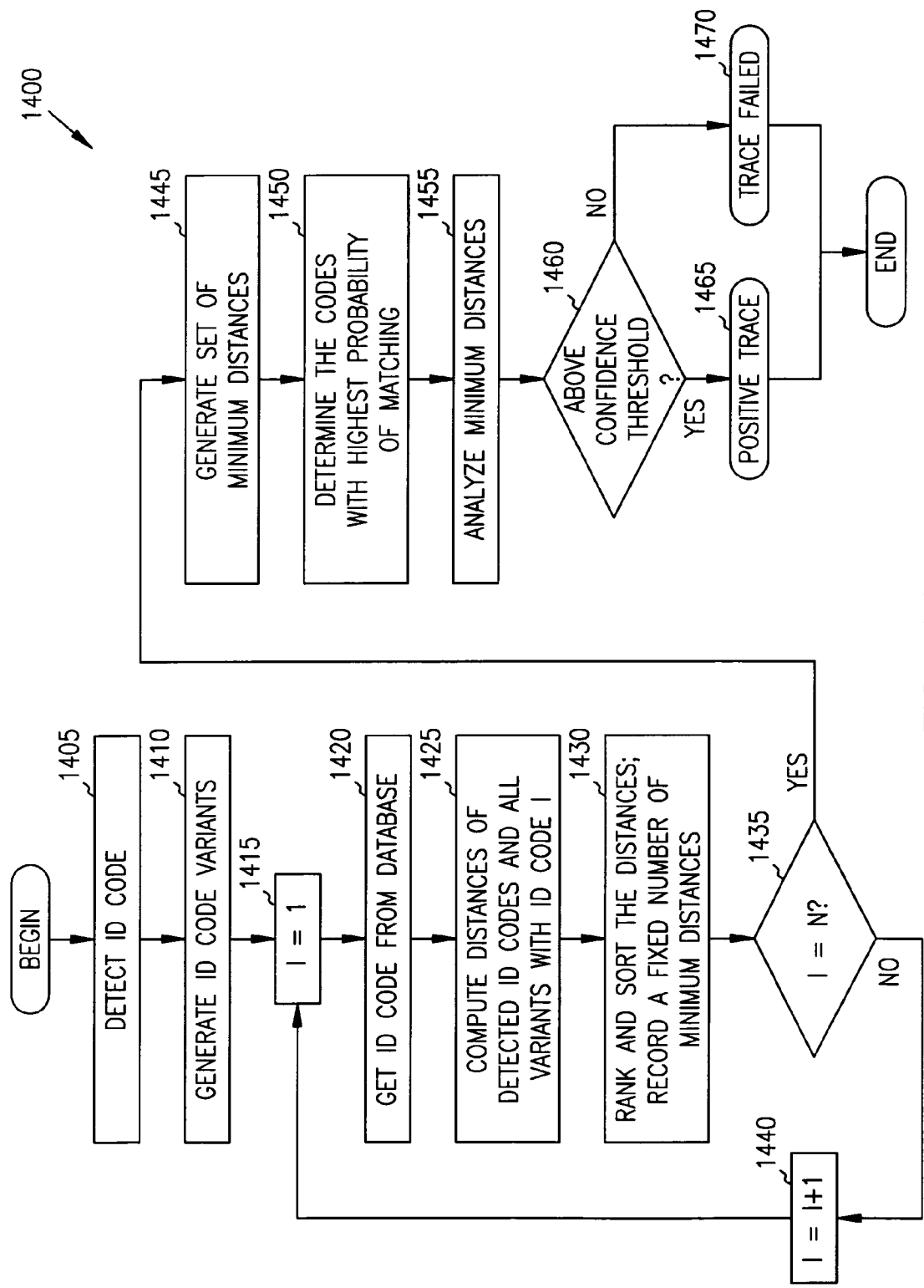
FIG. 14 is a flowchart of an embodiment of a method of tracing source or user based on detected user information.

FIG. 14 is a flowchart of an embodiment of a method of tracing source or user based on detected user information. In essence, in method 1400, an ID code and its variants are matched to an ID code of known sources and users by determining the ID codes variants within minimal distance of the known ID codes, within a threshold of confidence.

Method 1400 include the detection or extraction of an estimated ID code or user information 1405, such as disclosed in conjunction with FIGS. 10-13 and 18, and receiving the detected or extracted ID code. The method also includes retrieving or receiving known ID codes (not shown) from a source, such as a database. Thereafter, variants of the detected ID code are generated 1410. Variants are generated because the detected ID codes are not known within complete certainty after having been extracted from the watermarked image.

Subsequently, the ID code and the ID code variants are compared to the database to determine the best fit, which includes the specific actions of initializing a counter to indicate the beginning of the ID code database 1415, such as setting a counter variable "I" to 1, retrieving the ID code pointed to by the counter 1420 from the ID database, such as retrieving ID code I from the ID code database, computing the distances 1425 of the detected ID code and ID code variants to the ID code retrieved in action 1420, ranking and sorting the distances and recording a fixed number of minimum distances 1430, until the counter variable has exhausted the database of ID codes 1435, 1440.

Thereafter, the set of minimum distances is determined 1445. Subsequently, the codes having the highest probability of matching are determined 1450 and the minimum distances of the codes of those codes are analyzed 1455 to determine if any of those codes are above a minimum threshold of confidence level 1460. The threshold guards against false positive detection. If one or more ID codes meet the threshold of confidence, an indication of a successful trace of the source or user indicated by the mark of identification information, such as in FIG. 5, is made 1465, otherwise, an indication of a failure to trace is made. Finally, if a successful trace is performed, a determination as to whether or not the source or user indicated by the mark is an authorized source or user.

Figure 15:
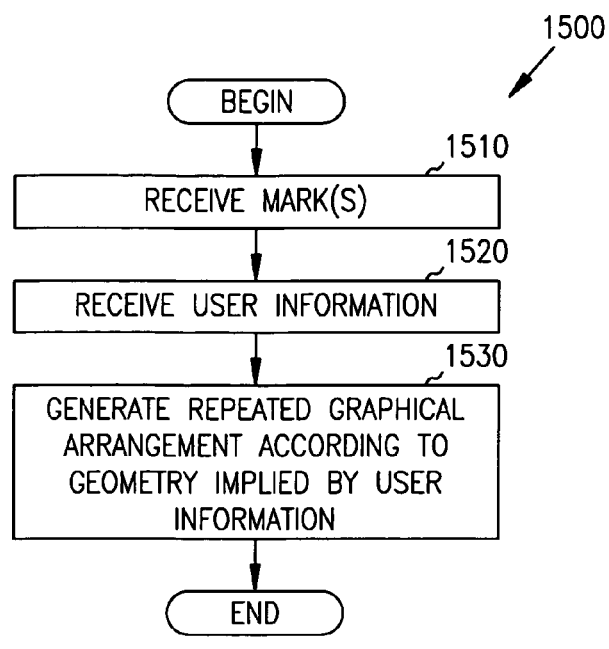
FIG. 15 is a flowchart of an embodiment of a method of creating a mark in which an arrangement of the bit string indicates user information.

Referring next to FIG. 15, a flowchart of an embodiment of a method 1500 of creating a mark in which a geometric arrangement of a background image or graphic indicates user information, is shown.

Method 1500 includes generating or receiving one or more marks, such as shown in 1510 in FIG. 5. The method also includes receiving user information to be encoded 1520, i.e. a bit string that determines the geometric arrangement of the background objects.

Finally, the method includes generating a repeated graphical arrangement according to geometry implied by user information 1530. More specifically the method includes generating a background image or modifying a host image, from repeated instances of the mark(s), in which the user information is encoded by the geometric arrangement of the repeated instances of the mark. In one embodiment of action 1530, the host image is modified by combining repetitions of the mark of identification information, such as in FIG. 5, with the host image in which the user information is encoded through a geometric arrangement of the repetitions. In one embodiment of method 1500, the method 1500 also includes combining the background image with a host image to generate a marked image. In another embodiment of method 1500, the host image is combined with a second image background after combining the host image with the first document background; in other words, one or more multiple document backgrounds are readily combined with a host image.

Figure 16:
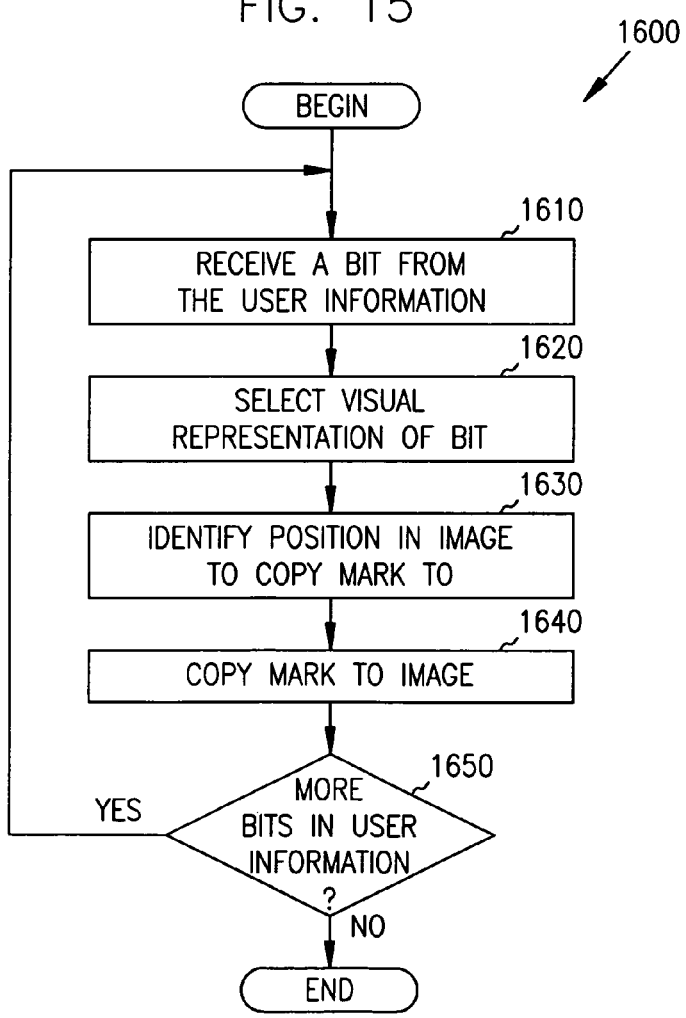
FIG. 16 is a flowchart of an embodiment of a method of generating a bit plane using an arrangement of the bit string disclosed in conjunction with FIG. 15.

Referring next to FIG. 16, a flowchart of an embodiment of a method 1600 of generating a repeated graphical arrangement according to geometry implied by user information, as in action 1530 in FIG. 15, is shown.

Method 1600 begins receiving a bit from the user information 1610, the bit being the next bit in the user information that has not been received since the start of the method. Thereafter, the visual representation of bit is selected 1620. Subsequently, the bit received in action 1610 is used to identify a position in the image (the host image or the background image) for replication or copying of the mark of identification information, such as in FIG. 5, 1630. Thereafter, the mark of identification information, such as in FIG. 5, is copied to the position in the image 1640, the position having been identified in action 1630. Thereafter, a determination of the number of bits remaining in the user information is made 1650, and if more bits remain in the user information that have not been processed by action 1610, 1620, 1630, and 1640, the next bit sequence in the user information is determined, the method continues at action 1610, otherwise the method ends.

In one embodiment of method 1500 and method 1600, the user information comprises a series, or string, of bits, in which each bit has one of two distinct binary values. Each of the two distinct binary bit values in the user information indicates a distinct geometry in the generation of the repeated arrangement 1530. The number of bits in the user information determines and corresponds to the number of the repeated instances of the bit string. Each bit in the user information identifies the arrangement of the corresponding instance of the repeated instances of the mark. The method also includes the action of receiving, determining or identifying the arrangement to be used in the generation of the image.

More specifically, where the arrangement indicates rotation of the instance of the mark of identification information, such as in FIG. 5, during replication or copying, each bit in the user information will indicate how or to what extent the corresponding mark of identification information, such as in FIG. 5, in the image is rotated. The indication of rotation can be relative to the previous replication of the mark, or from an absolute position, as an upright position or an upside-down position. In an example where the arrangement indicates rotation from an absolute upright position and a bit value "0" indicates rotation 30 degree to the right and bit value "1" indicates rotation 60 degree to the left and where the user information is a string of binary "011010", the first mark of identification information, such as in FIG. 5, replicated in the image is rotated to the right 30 degrees from the upright position, the second mark will be rotated to the left 60 degrees from the upright position, the third mark is rotated to the left 60 degrees from the upright position, the fourth mark will be rotated to the right 30 degrees from the upright position, the fifth mark will be rotated to the left 60 degrees from the upright position, and the sixth mark will be rotated to the right 30 degrees from the upright position.

Furthermore, where the arrangement indicates a separation between the repeated instances of the mark, each bit in the user information will indicate how or to what extent the marks will be separated. In one embodiment, the separation indicates a distance identified in terms of a number of pixels. The indication of separation is relative to the previous replication of the mark, or from an absolute position, such as the beginning of the image. In an example where the arrangement indicates separation relative to the previous replication and a bit value "0" indicates a separation of sixteen pixels and bit value "1" indicates separation of twenty-four pixels and where the user information is a string of binary "011010", the first mark of identification information, such as in FIG. 5, replicated in the image will be separated by sixteen pixels from the beginning of the image, the second mark will be separated by twenty-four pixels from the previous mark, the third mark will be separated by twenty-four pixels from the previous mark, the fourth mark will be separated by sixteen pixels from the previous mark, the fifth mark will be separated by twenty-four pixels from the previous mark, and the sixth mark will be separated by sixteen pixels from the previous mark.

Furthermore, where the arrangement indicates an alternation between two images in the copying or replication into the image, the method also includes receiving a second mark and each bit in the user information will indicate how or to what extent the marks will be alternated. In one embodiment, the alternation indicates an alternation between two received marks. The indication of alternation is relative to the previous replication of the mark, or in another embodiment is interpreted in an absolute sense. In an example where the arrangement indicates alternation between two marks and a bit value "0" indicates a replication of the first mark of identification information, such as in FIG. 5, and bit value "1" indicates replication of the second mark and where the user information is a string of binary "011010", the first mark of identification information, such as in FIG. 5, replicated in the image will be the first received mark, the second mark replicated in the image will be the second received mark, the third mark replicated in the image will be the second received mark, the fourth mark replicated in the image will be the first received mark, the fifth mark replicated in the image will be the second received mark, and the sixth mark replicated in the image will be the first received mark. In another embodiment, combinations of arrangement types are utilized to increase the embedded information content, thereby embedding multiple bits of information in each mark placement.

Figure 17:
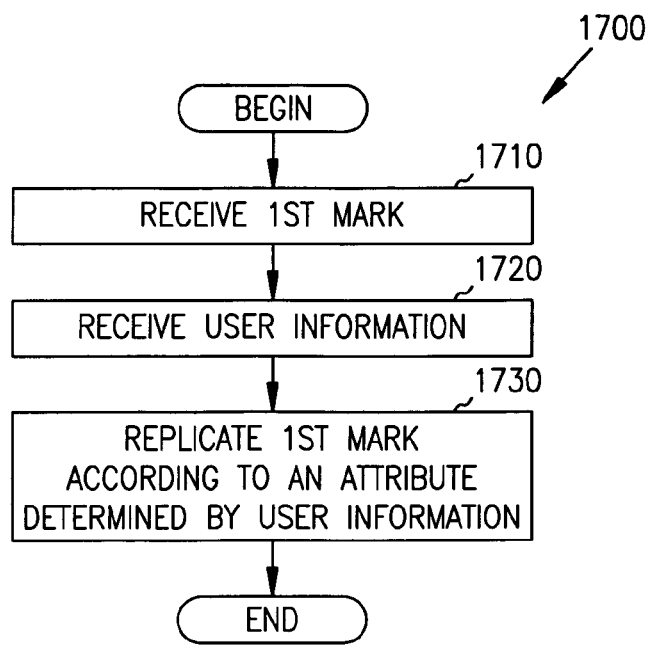
FIG. 17 is a flowchart of an embodiment of a method of creating a mark of user information according to attributes determined by the user information.

Referring next to FIG. 17, a flowchart of an embodiment of a method 1700 of creating a mark of user information according to attributes determined by the user information, is shown.

Method 1700 includes receiving a mark of identification information, such as in 1710 in FIG. 5. The method also includes receiving user information 1720 that determines the attributes. Attributes include geometric placement or alternate placement.

Finally, the method includes generating a background image or modifying a host image according to the attributes determined by the user information 1730. More specifically, the method includes generating an image from repeated instances of the bit string in which the user information is encoded in the image by the attributes of the repeated instances of the bit string.

In one embodiment, method 1700 also includes receiving a second mark and in which the attribute indicates alternate placement of the first mark of identification information, such as in FIG. 5, and the second mark. In another embodiment, the attribute indicates the position of each instance of the first mark of identification information, such as in FIG. 5, relative to a preceding instance of the first mark of identification information, such as in FIG. 5, and a succeeding instance of the first mark. In yet another embodiment of method 1700, the attribute indicates the distance of each instance of the first mark relative to a preceding instance of the first mark and a succeeding instance of the first mark.

Figure 18:
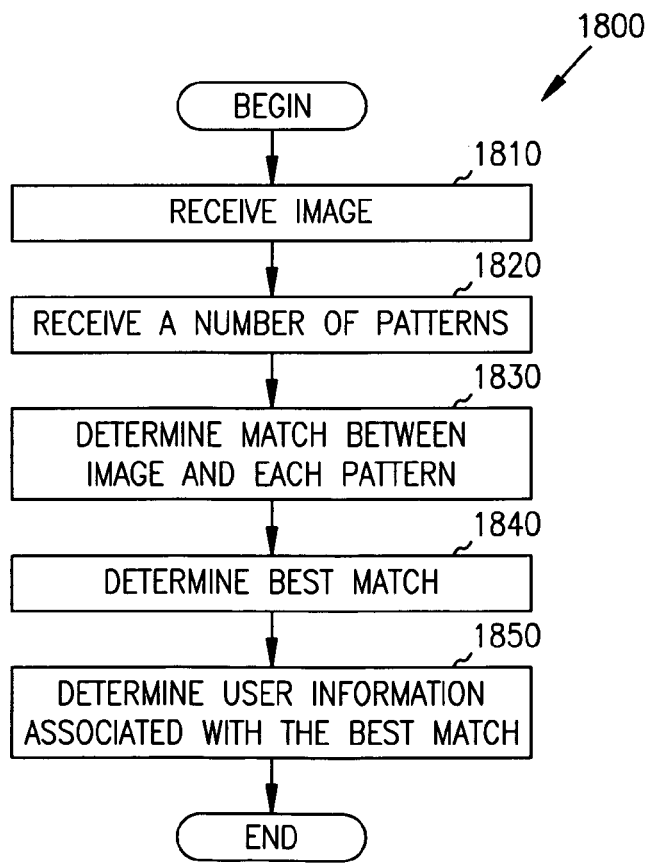
FIG. 18 is a flowchart of an embodiment of a method of determining user information from a marked image created by the methods disclosed in conjunction with FIGS. 16-17.

Referring next to FIG. 18, a flowchart of an embodiment of a method 1800 of determining user information from a marked image created by the methods disclosed in conjunction with FIGS. 15-16 in which user information is encoded through the arrangement or attributes of replicated mark(s) is shown.

Method 1800 includes receiving an image marked by a visible pattern 1810 generated by methods disclosed in conjunction with FIG. 15, FIG. 16 or FIG. 17. The marked image is the image whose user identity is to be determined. Thereafter, a number of marks are received 1820 from a source, such as a database. In one embodiment the marks are patterns or images. Each mark of identification information received in action 1820 is associated with pre-determined user information. That is, for each user in the database, a candidate reference mark is generated in accordance with FIG. 15, FIG. 16, or FIG. 17 (1820). Subsequently, the method includes matching the image received in action 1810 to the patterns or images received in action 1820 to determine the extent to which each pattern matches the image. In one embodiment the matches are determined by generating a plurality of correlations, one correlation for each of the plurality of patterns, in which the result of the correlation calculation is a value. Thereafter, the closest match is determined 1840. In one embodiment, the correlation having the maximal correlation generated in action 1830 is determined. The closest match or correlation ultimately identifies the user information, therefore, the method lastly determines the user information associated with the pattern of the plurality of patterns 1850 corresponding to the correlation having the greatest value of the plurality of correlations.

Implementation

Figure 19:
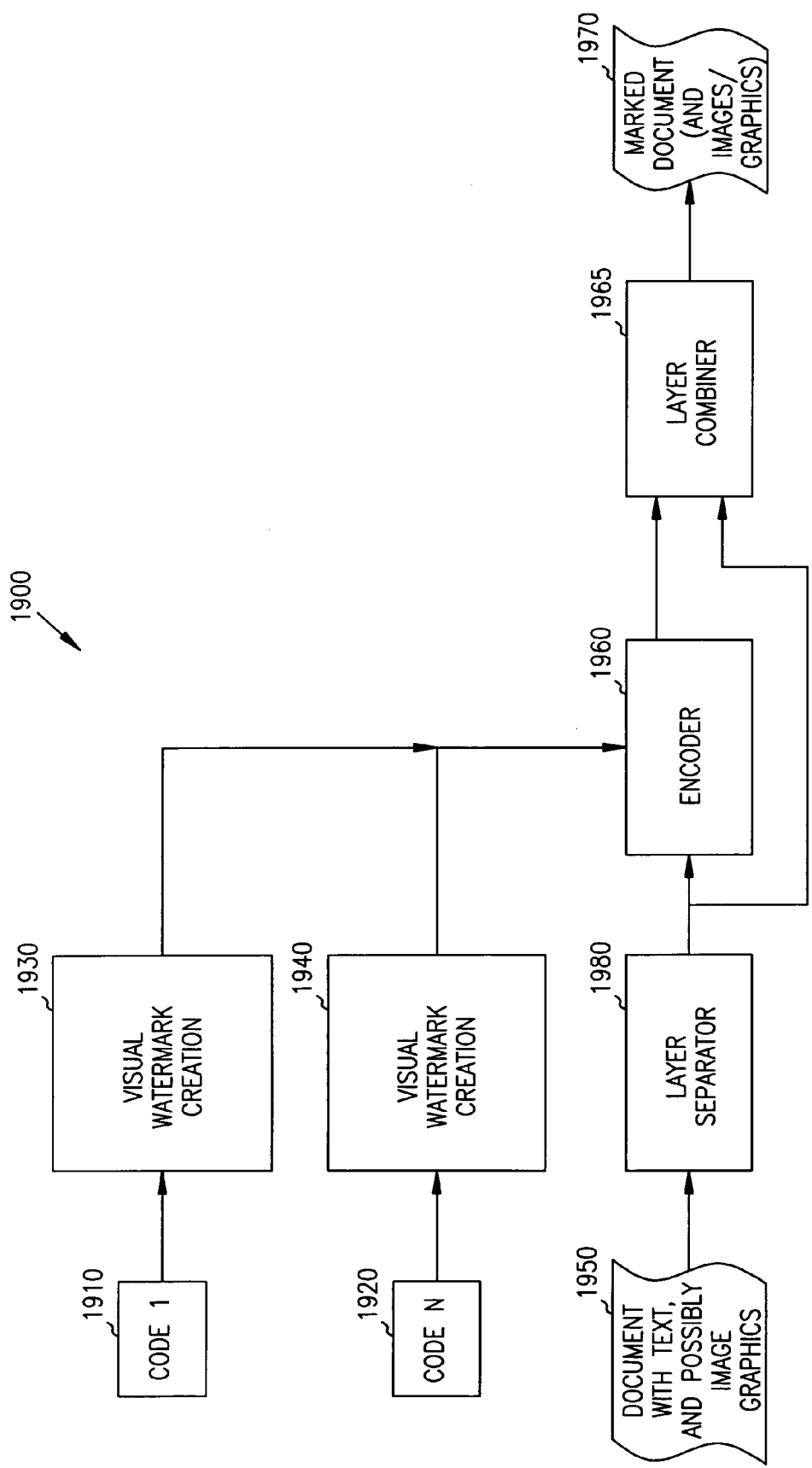
FIG. 19 is a block diagram of an embodiment of a system for generating marked images.
Figure 20:
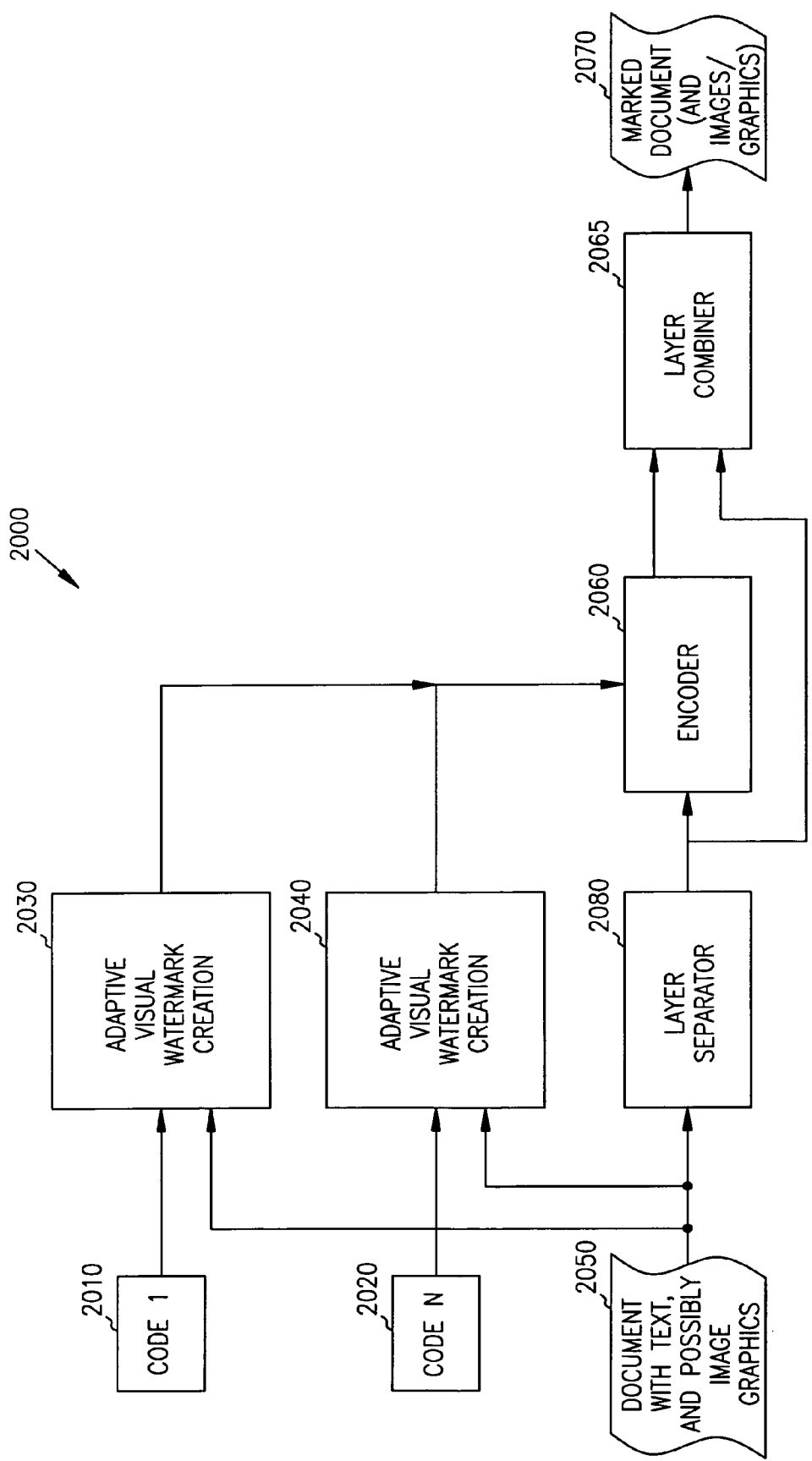
FIG. 20 is a block diagram of an embodiment of a system for generating adaptively marked images.
Figure 21:
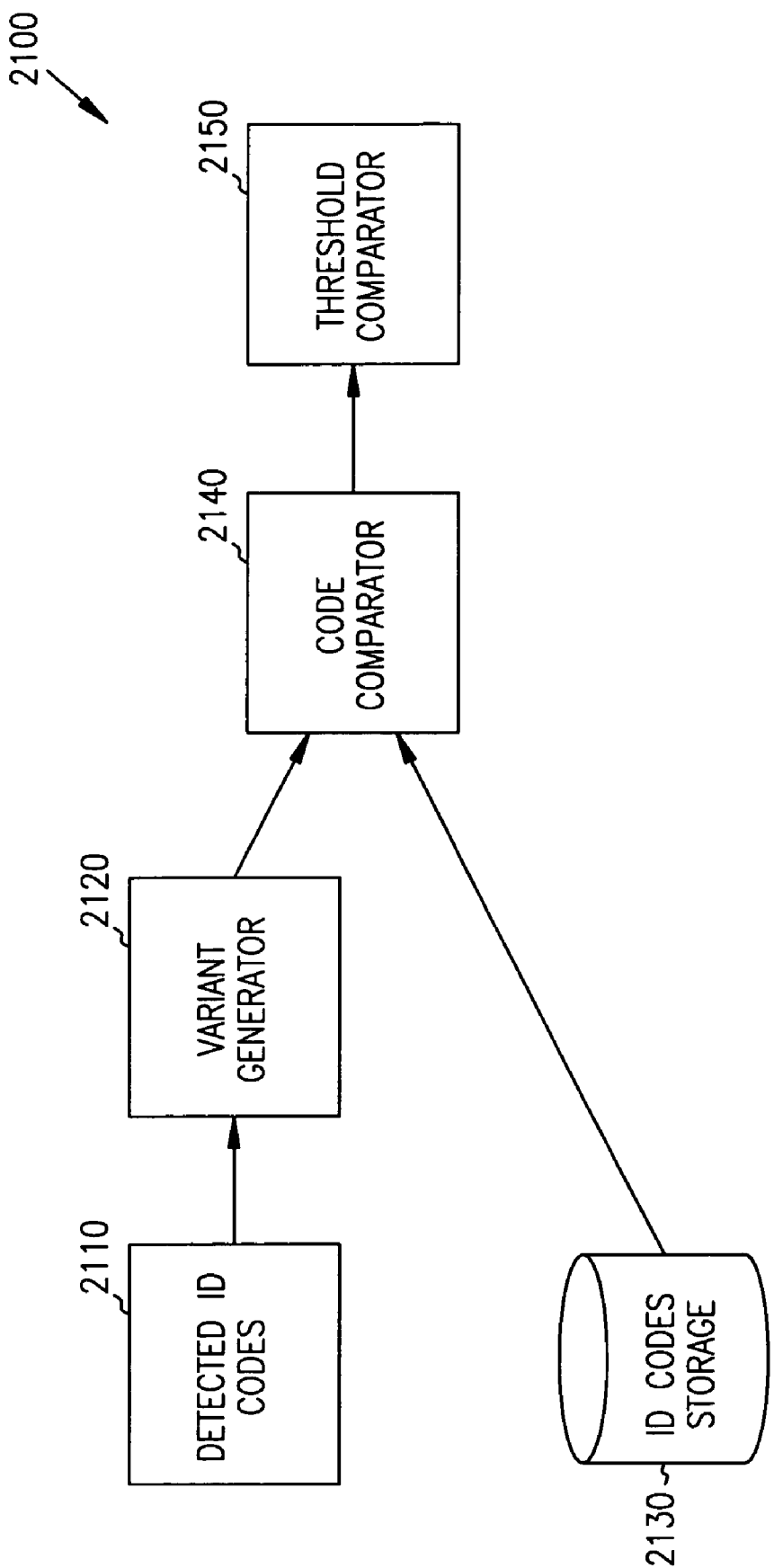
FIG. 21 is a block diagram of an embodiment of a system for tracing the source using the method disclosed in conjunction with FIG. 14.

Referring to FIGS. 19-21, implementations of the invention are described in conjunction with the methods described above. The system components can be embodied as computer hardware circuitry, as computer-readable program, or a combination of both.

More specifically, in the computer-readable program embodiment, the programs can be structured in an object-orientation using an object-oriented language such as Java, Smalltalk or C++, and/or the programs can be structured in a procedural-orientation using a procedural language such as COBOL or C. The software components communicate in any of a number of mechanisms that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). The components execute on as few as one computer as in computer 110 in FIG. 1, or may execute on multiple computers.

FIG. 19 is a block diagram of an embodiment of a system for generating marked images.

System 1900 includes one or more sources for ID codes 1910 and 1920, each source having user information that is received or generated, stored and transmitted. The source(s) are operatively coupled to one or more watermark generator(s) 1930 and 1940. The watermark generator(s) 1930 and 1940 generate a watermark from the user information in accordance with the methods disclosed above. System 1900 also includes a document source 1950, such as a mass storage device, that receives or generates a document and transmits the document. An encoder 1960 is operatively coupled to the watermark generator(s) 1930 and 1940 and the document source 1960, in which the document is encoded with or marked with, (such as combining), the watermark. In varying embodiments, the encoder is called by, or implemented as a component of any one of the following: paint programs that allow the user to create rough freehand drawings, illustration/design programs that enables the user to create bar charts, pie charts, graphics, and other types of images for slide shows and reports, animation programs that enable to chain and sequence a series of images to simulate movement, in which each image is similar to a frame in a movie, CAD programs which enable architects and engineers to draft designs, and desktop publishing programs which provide a full set of word-processing features as well as fine control over placement of text and graphics. In another embodiment, the encoder operates in a standalone fashion.

The encoder 1960 transmits the encoded or marked image to a layer combiner 1965. The layer combiner 1965 combines the encoded or marked image with a document, generating an encoded or marked document 1970, that is transmitted to a destination (not shown). In one embodiment, the system 1900 includes a layer separator operatively 1980 coupled between the document source 1950 and the encoder 1960 in which image layer(s) of the document received from the document source 1950 are removed before transmission to the encoder 1960, and repackaged afterwards. In another embodiment, the layer separator operatively 1980 is coupled directly to the layer combiner 1965 in which separated images are transmitted to the layer combiner and not encode with a visual watermark.

FIG. 20 is a block diagram of an embodiment of a system for generating adaptively marked images.

System 2000 includes one or more sources for ID codes 2010 and 2020, each source having user information that is received or generated, stored and transmitted. The system 2000 includes a document source 2050, such as a mass storage device, that receives or generates a document and transmits the document. The system 2000 also includes one or more watermark generator(s) 2030 and/or 2040 that are operatively coupled to the source(s) 1910, 1920, and/or 1950. The watermark generator(s) 2030 and/or 2040, generate a watermark from the user information that is adapted to the local characteristics of the document in accordance with the methods disclosed in conjunction with FIGS. 4-9 and FIGS. 15-17.

The encoder 2060 transmits the encoded or marked image to a layer combiner 2065. The layer combiner 2065 combines the encoded or marked image with a document, generating a encode or marked document 2070, that is transmitted to a destination (not shown). In one embodiment, the system 2000 includes a layer separator 2080 operatively coupled between the document source 2050 and the encoder 2060 in which image layer(s) of the document received from the document source 2050 are removed before transmission to the encoder 2060, and repackaged afterwards. In another embodiment, the layer separator 2080 operatively is coupled directly to the layer combiner 2065 in which separated images are transmitted to the layer combiner and not encode with a visual watermark.

FIG. 21 is a block diagram of an embodiment of a system for tracing the source using the method disclosed in conjunction with FIG. 14.

Apparatus 2100 includes a source 2110 of one or more detected or extracted ID codes that are produced in accordance with the methods disclosed in conjunction with FIGS. 10-13, FIG. 18 and action 1405 in FIG. 14. A variant generator 2120 is operative coupled to the source 2110 that received ID code from the source 2110 and generates variants of the ID codes in accordance with action 1410 in FIG. 14. Apparatus 2100 also includes a source of known ID codes 2130, such as a database management system. An ID code comparator 2140 is operatively coupled to the variant generator 2120 and the source of known ID codes 2130, which receives the variants generated by the variant generator 2120 and the known ID codes from the source of known ID codes 2130. The ID code comparator 2140 matches the ID code and variants by determining the ID codes within minimal distance of the known ID codes, in accordance with actions 1415-1455 in FIG. 14. A threshold comparator 2150 is operatively coupled to the ID code comparator 2140 to determine if the detection falls within a pre-determined threshold of confidence.

Figure 22:
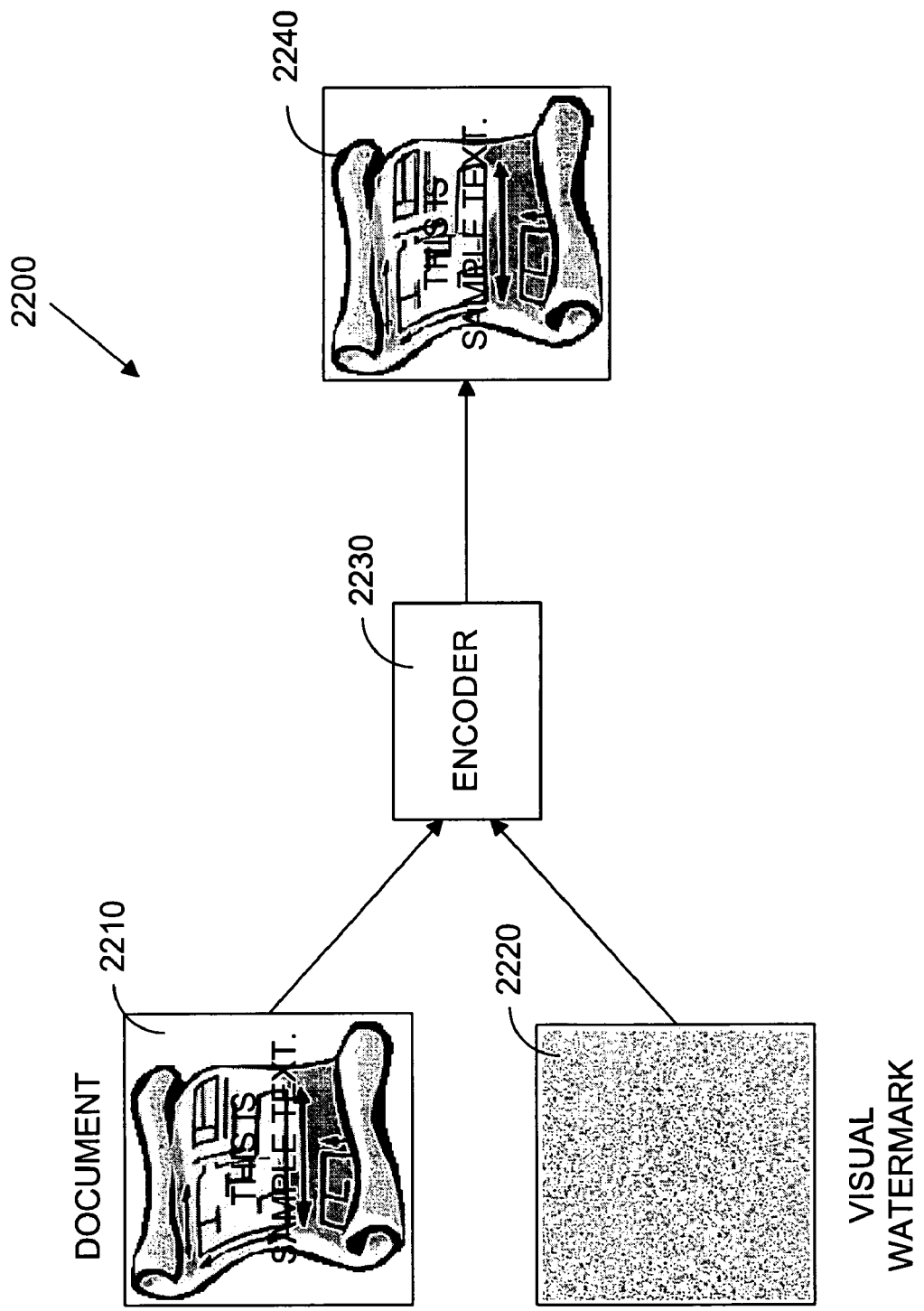
FIG. 22 is a block diagram of an embodiment of an apparatus for visual marking of documents without layer separation.

FIG. 22 is a block diagram of an embodiment of a system 2200 for visual marking of documents without layer separation.

Apparatus 2200 includes an encoder 2230 that receives a host document 2210 or host image and a visual watermark 2220 that is generated by one of the methods described in conjunction with FIGS. 4, 5, 7, 8, and 9 and FIGS. 15-17. The encoder 2230 combines the host document 2210 and the visual watermark 2220, creating a watermarked document 2240. Thereafter, the watermarked document 2240 is decoded by one of the methods described in conjunction with FIGS. 10-13 and FIG. 18.

Figure 23:
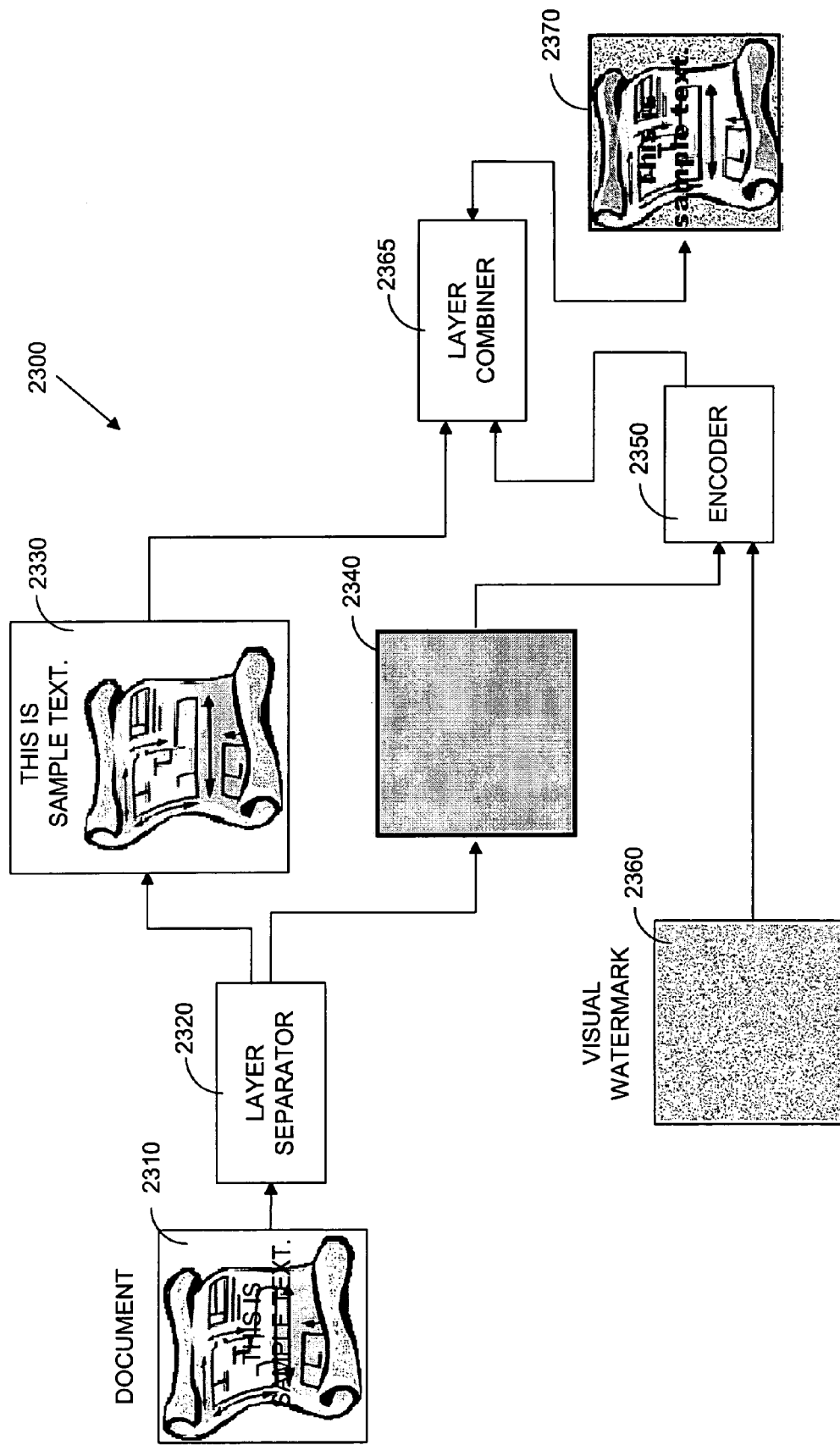
FIG. 23 is a block diagram of an embodiment of a system for visual marking of documents with layer separation.

FIG. 23 is a block diagram of an embodiment of a system 2300 for visual marking of documents with layer separation. Apparatus 2300 illustrates the adaptive visual watermarking in which the document can be separated in regions or layers, each processing a different watermark or no watermark at all, to produce the final marked document. Such marked document is composed from the marked of unmarked layers or regions.

Apparatus 2300 includes a layer separator 2320 that receives a host document 2310 and separates an identified layer or region of a document 2330 from the host document 2310 and generates a separated layer or layers 2340, also known as the document background.

An encoder 2350 receives a visual watermark 2360 that is generated by one of the methods described in conjunction with FIGS. 4, 5, 7, 8, and 9 and FIGS. 15-17, and the encoder 2350 receives the separated layer(s) 2340. The encoder combines the separated layer(s) 2340 and the visual watermark 2360, creating a watermarked layer(s) (not shown). The unwatermarked 2330 and watermarked layers from encoder 2350 are then combined and repackaged by layer combiner 2365 to form the watermarked document 2370. Thereafter, the watermarked document 2370 is decoded by one of the methods described in conjunction with FIGS. 10-13 and FIG. 18.

Figure 24:
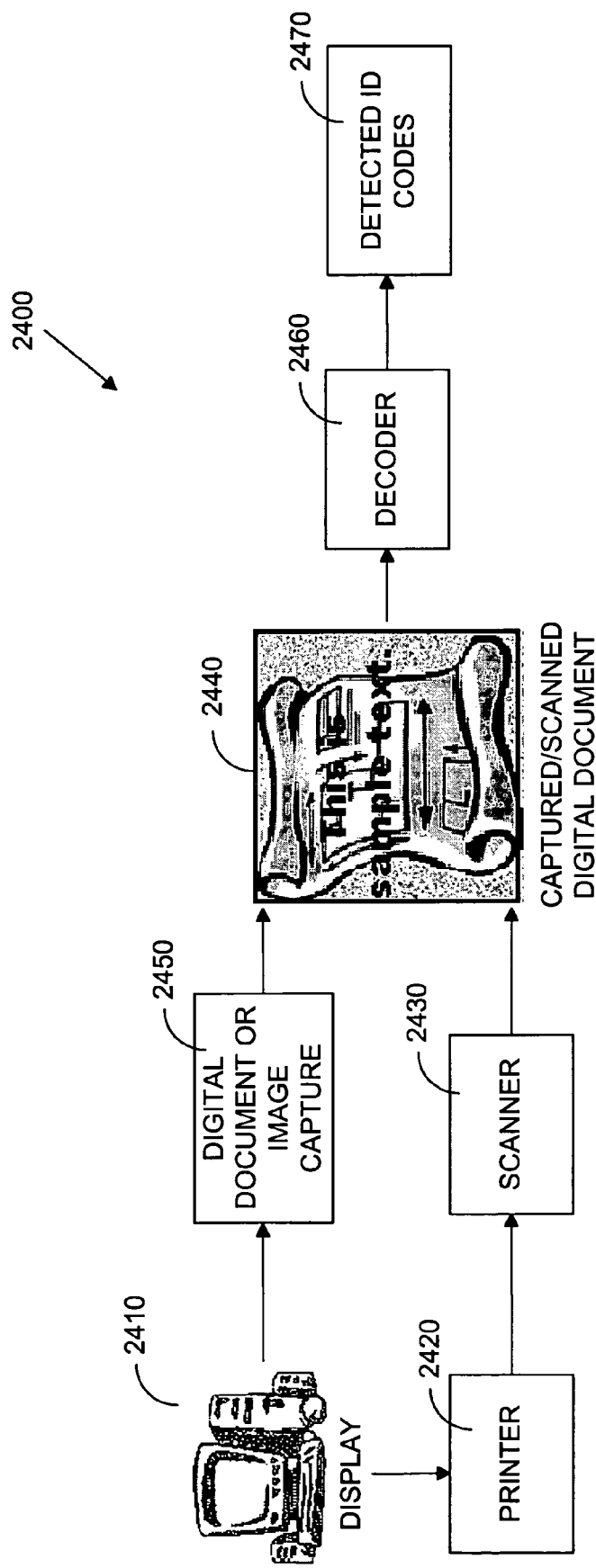
FIG. 24 is a block diagram of an embodiment of a system for decoding a visual mark.

FIG. 24 is a block diagram of an embodiment of a system 2400 for decoding a visual mark. Apparatus 2400 solves the problem of conventional prior art invisible watermarking techniques that are unable to embed digital data bit strings indicating ownership, user or recipient identification.

Apparatus 2400 includes a display device 2410, such as display device 112 in FIG. 1, that displays a watermarked document or image that is generated by on of the methods described in conjunction with FIGS. 4, 5, 7, 8, and 9 and FIGS. 15-17 or apparatus described in conjunction with FIGS. 22-23.

Apparatus 2400 also includes a printer 2420 operatively coupled to the display device 2410 that prints the marked document, and a scanner 2430 that is operatively coupled to the printer 2420 that scans the printed output marked image from the printer 2420, resulting in a electronic scanned digital document 2440.

Alternatively, apparatus 2400 includes a image capture apparatus 2450 that captures the images displayed on the display device 2410, resulting in an electronic captured digital document 2440.

The electronic captured/scanned digital document 2440 is received by an operatively coupled decoder 2460 that generates one or more detected ID codes 2470. The decoder decodes the ID codes 2470 from the electronic captured/scanned digital document 2440 using detection or extraction of an estimated ID code or user information as disclosed by the methods disclosed in conjunction with FIGS. 10-13 and 18.

CONCLUSION

A watermark encoding, decoding and tracing system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in object-oriented terms, one of ordinary skill in the art will appreciate that the invention can be implemented in a procedural design environment or any other design environment that provides the required relationships.

In particular, one of skill in the art will readily appreciate that the names of the methods and apparatus are not intended to limit embodiments of the invention. Furthermore, additional methods and apparatus can be added to the components, functions can be rearranged among the components, and new components to correspond to future enhancements and physical devices used in embodiments of the invention can be introduced without departing from the scope of embodiments of the invention. One of skill in the art will readily recognize that embodiments of the invention can be applicable to future communication devices, different file systems, and new data types.

The terminology used in this application is meant to include all object-oriented, database and communication environments and alternate technologies which provide the same functionality as described herein.

We claim:

1. An apparatus comprising:
    an identification generator to generate an identification bit string associated with requestor information and to generate a bit plane based on the identification bit string, wherein:
        the bit plane includes repeated instances of the identification bit string;
        the bit plane is generated by dividing a plurality of bits into a set of blocks arranged in rows;
        every bit in each of the set of blocks has a same value;
        the value is assigned to the bits of each block by tiling the information bit string across the blocks; and
        at an end of a row of blocks, the information bit string wraps around to a beginning of a next row of blocks; and
    a document marker to mark a document image with the bit plane, the document marker to mark the document image by adding bits of the bit plane to intensity values of pixels of the document image.

2. The apparatus of claim 1, wherein the requestor information is selected from the group consisting of requestor identification information, intended document control information, and document usage information.

3. The apparatus of claim 2, wherein the requestor identification information includes identification information associated with at least one recipient of the document.

4. The apparatus of claim 1, wherein the bit plane is generated by tiling the information bit string, and wherein at an end of each row of the bit plane, the information bit string wraps around to a beginning of a next row.

5. The apparatus of claim 1, wherein a number of bits in the bit plane is equal to a number of pixels of the document image.

6. The apparatus of claim 1, wherein each of the set of blocks has a horizontal dimension and a vertical dimension, and wherein both the horizontal dimension and the vertical dimension are equal to a spreading factor.

7. The apparatus of claim 1, wherein the information bit string includes at least one delimiter.

8. A method comprising:
    generating a bit string based on document information;
    generating a bit plane, wherein the bit plane includes repeated instances of the bit string;
    scaling the bit plane to a target image, wherein the scaling includes:
        dividing the bit plane into a number of blocks, wherein each of the number of blocks has a horizontal dimension and a vertical dimension, and wherein the values of the horizontal dimension and vertical dimension are equal to a spreading factor; and
        populating each of the blocks with a bit from the bit string, wherein each bit of a block is equal to the bit from the bit string, and wherein each of the bits of the bit string are sequentially tiled across the blocks, and wherein at an end of a row of the blocks, the bit string is wrapped around to a beginning of a next row; and
    generating a marked image by combining the bit plane with the target image, wherein the combining includes adding bits of the bit plane to intensity values of pixels of the target image.

9. The method of claim 8, wherein the bit string includes at least one delimiter.

10. The method of claim 8, wherein the document information is selected from the group consisting of recipient identification information, owner identification information, document usage information, a process identification, type of authorized use, and the number of copies permitted.

11. The method of claim 8, wherein the marking of the image is maintained during document handling, and wherein the document handling is selected from the group of operations consisting of copying, printing and scanning.

12. The method of claim 11, wherein the at least one recipient of the document can be traced based on the marking of the image.

13. A tangible computer-readable medium with instructions thereon which, when executed by a computer, cause the computer to perform operations comprising:
    generating an estimated bit plane from a marked image, wherein:
        the generating the estimated bit plane includes determining intensities of pixels of the marked image and, based on the intensities, populating bits of the bit plane;
        the estimated bit plane includes a plurality of repeated instances of a graphical image; and
        ones of the plurality are rotated according to bits of the bit string;
    generating an estimated bit string from the estimated bit plane, wherein the estimated bit string includes estimated identification information; and comparing the estimated identification information to stored identification to determine a successful trace.

14. The computer-readable medium of claim 13, wherein the determination of the successful trace is based at least in part on a threshold of confidence.

15. The computer-readable medium of claim 13, wherein the estimated bit plane includes a plurality of repeated instances of the bit string.

16. A system comprising:
   a dynamic random access memory unit to store a graphic image;
   an identification generator to generate an identification bit string associated with user information and to generate a bit plane having a plurality of repeated instances of the graphic image, wherein the plurality of repeated instances are arranged based on the identification bit string and the arranging includes rotation of the graphic image based on values of bits of the identification bit string; and
   a document marker to mark a document image with the bit plane, the document marker to mark the document image by adding bits of the bit plane to intensity values of the pixels.

17. The system of claim 16, wherein the user identification information includes at least one recipient of the document.

* * * * *